(12) United States Patent
Collier et al.

(10) Patent No.: US 10,133,010 B2
(45) Date of Patent: Nov. 20, 2018

(54) FIBER OPTIC CABLE ASSEMBLIES WITH CAP APPARATUSES FOR SEALING OPTICAL FIBER CONNECTORS AND ASSOCIATED METHODS

(71) Applicant: CORNING OPTICAL COMMUNICATIONS LLC, Hickory, NC (US)

(72) Inventors: Adam Kent Collier, Montour Falls, NY (US); Michael de Jong, Colleyville, TX (US); David Ralph Maack, Horseheads, NY (US); Jerald Lee Overcash, China Grove, NC (US)

(73) Assignee: Corning Optical Communications LLC, Hickory, SC (US)

( * ) Notice: Subject to any disclaimer, the term of this patent is extended or adjusted under 35 U.S.C. 154(b) by 70 days.

(21) Appl. No.: 15/165,194

(22) Filed: May 26, 2016

(65) Prior Publication Data

US 2016/0349459 A1   Dec. 1, 2016

Related U.S. Application Data

(60) Provisional application No. 62/167,957, filed on May 29, 2015.

(30) Foreign Application Priority Data

Jun. 22, 2015 (EP) ..................................... 15173169

(51) Int. Cl.
*G02B 6/38* (2006.01)

(52) U.S. Cl.
CPC ............ *G02B 6/3849* (2013.01); *G02B 6/387* (2013.01); *G02B 6/3866* (2013.01); *G02B 6/3885* (2013.01); *G02B 6/3893* (2013.01)

(58) Field of Classification Search
None
See application file for complete search history.

(56) References Cited

U.S. PATENT DOCUMENTS

| 5,214,730 A | | 5/1993 | Nagasawa et al. | |
|---|---|---|---|---|
| 5,506,922 A | * | 4/1996 | Grois | ................... G02B 6/3825 385/75 |

(Continued)

FOREIGN PATENT DOCUMENTS

| CN | 2879221 Y | 3/2007 |
|---|---|---|
| CN | 201083853 Y | 7/2008 |

(Continued)

OTHER PUBLICATIONS

International Search Report and Written Opinion PCT/US2016/030928 dated Oct. 20, 2016.

(Continued)

*Primary Examiner* — Chad H Smith
(74) *Attorney, Agent, or Firm* — Adam R. Weeks

(57) ABSTRACT

A cap apparatus is mounted to a fiber optic connector having a ferrule supporting optical fiber(s). A sealing apparatus is cooperatively configured with the cap apparatus for protecting an end face of the ferrule. The cap apparatus includes a body having opposite ends between which a cavity extends. The opposite ends of the body respectively define first and second openings to the cavity. A portion of the fiber optic connector extends through the first opening and into the cavity. The cap apparatus includes a cover mounted to the body and at least partially obstructing the second opening, wherein the end face of the ferrule is positioned within the cavity at a location spaced from the cover. The sealing apparatus is positioned between at least a portion of the cover and the end face of the ferrule.

17 Claims, 15 Drawing Sheets

(56) References Cited

U.S. PATENT DOCUMENTS

| | | | |
|---|---|---|---|
| 6,227,717 B1 | 5/2001 | Ott et al. | |
| 6,449,795 B1 * | 9/2002 | Sato | B08B 1/00 15/209.1 |
| 6,547,450 B2 | 4/2003 | Lampert | |
| 6,554,485 B1 | 4/2003 | Beatty et al. | |
| 6,712,524 B2 | 3/2004 | Beatty et al. | |
| 7,164,840 B2 | 1/2007 | Hsieh | |
| 7,186,038 B2 | 3/2007 | Hovland et al. | |
| 7,232,595 B2 | 6/2007 | Coykendall et al. | |
| 7,256,221 B2 | 8/2007 | Coykendall et al. | |
| 7,394,964 B2 | 7/2008 | Tinucci et al. | |
| 7,572,066 B2 * | 8/2009 | de Jong | G02B 6/3849 385/39 |
| 7,723,441 B2 | 5/2010 | Shustack | |
| 7,841,777 B2 | 11/2010 | Howard et al. | |
| 8,262,294 B2 | 9/2012 | Marcouiller et al. | |
| 8,330,944 B2 | 12/2012 | Liu et al. | |
| 8,374,478 B2 | 2/2013 | Marcouiller et al. | |
| 8,579,518 B2 | 11/2013 | Isenhour et al. | |
| 8,594,479 B2 | 11/2013 | Liu et al. | |
| 8,705,931 B2 | 4/2014 | Liu et al. | |
| 8,998,503 B2 | 4/2015 | Barnette, Jr. et al. | |
| 9,207,407 B2 | 12/2015 | Barnette, Jr. et al. | |
| 2005/0147361 A1 | 6/2005 | Hovland et al. | |
| 2005/0220434 A1 | 10/2005 | Hsieh | |
| 2007/0031103 A1 | 2/2007 | Tinucci et al. | |
| 2007/0217749 A1 | 9/2007 | Jong et al. | |
| 2007/0243008 A1 | 10/2007 | Vogt | |
| 2009/0185778 A1 | 7/2009 | Howard et al. | |
| 2010/0302530 A1 | 12/2010 | Liu et al. | |
| 2010/0303434 A1 | 12/2010 | Liu et al. | |
| 2011/0013876 A1 | 1/2011 | Marcouiller et al. | |
| 2011/0188813 A1 | 8/2011 | Marcouiller et al. | |
| 2013/0308909 A1 | 11/2013 | Barnette, Jr. et al. | |
| 2014/0050447 A1 | 2/2014 | Liu et al. | |
| 2014/0086534 A1 | 3/2014 | Lu et al. | |
| 2015/0063759 A1 | 3/2015 | Barnette, Jr. et al. | |
| 2015/0110447 A1 | 4/2015 | Elenbaas et al. | |
| 2016/0041356 A1 | 2/2016 | Wang et al. | |
| 2016/0124173 A1 | 5/2016 | Kowalczyk et al. | |
| 2016/0349460 A1 * | 12/2016 | Collier | G02B 6/3849 |

FOREIGN PATENT DOCUMENTS

| | | |
|---|---|---|
| CN | 201527493 U | 7/2010 |
| CN | 202196201 U | 4/2012 |
| CN | 202404279 U | 8/2012 |
| CN | 202421554 U | 9/2012 |
| CN | 202421555 U | 9/2012 |
| CN | 202453541 U | 9/2012 |
| CN | 203759311 U | 8/2014 |
| CN | 203838371 U | 9/2014 |
| CN | 203870291 U | 10/2014 |
| DE | 20201170 U1 | 7/2002 |
| EP | 1726979 A2 | 11/2006 |
| EP | 1726979 A3 | 3/2007 |
| EP | 1726979 B1 | 6/2013 |
| JP | 2004012625 A | 1/2004 |
| JP | 2006276782 A | 10/2006 |
| WO | 2007106477 A1 | 9/2007 |
| WO | 2010138700 A1 | 12/2010 |
| WO | 2013173555 A1 | 11/2013 |
| WO | 2014008657 A1 | 1/2014 |
| WO | 2014052414 A1 | 4/2014 |
| WO | 2014118225 A1 | 8/2014 |
| WO | 201501710 A1 | 2/2015 |

OTHER PUBLICATIONS

European Search Report for application No. 15173169.2, dated Aug. 21, 2015, 7 pages.
European Search Report for application No. 15173176.7, dated Aug. 25, 2015, 8 pages.
International Search Report and Written Opinion PCT/US2016/030925 dated Oct. 27, 2016.

* cited by examiner

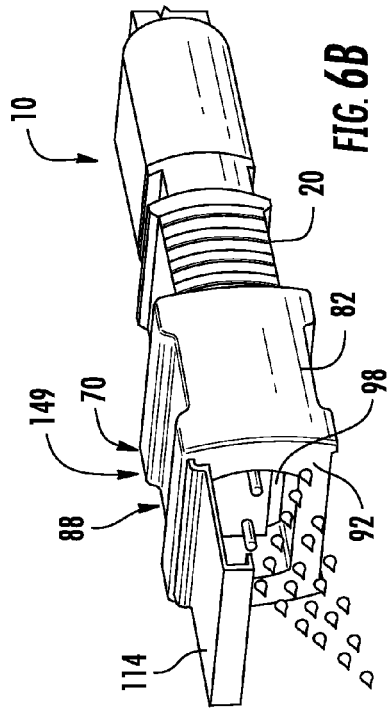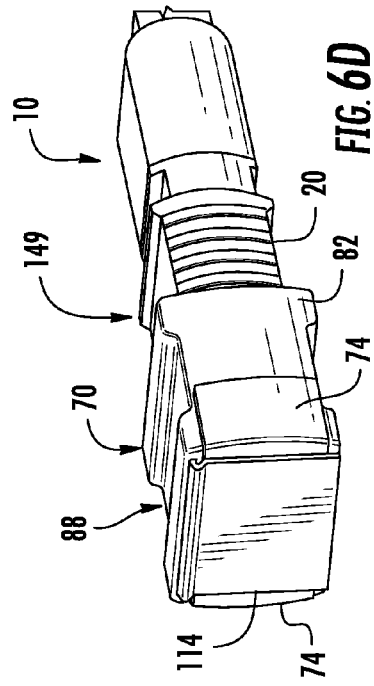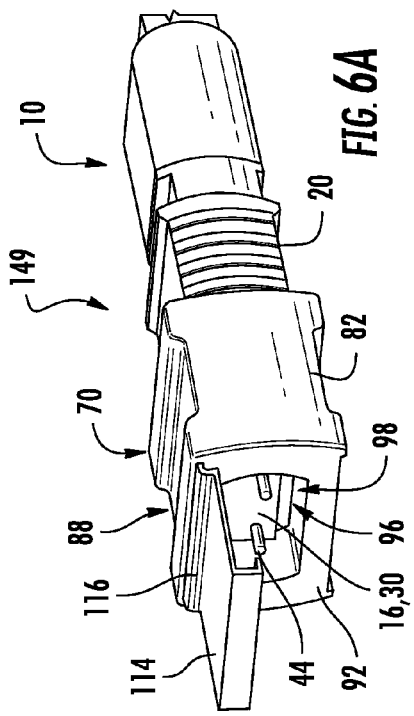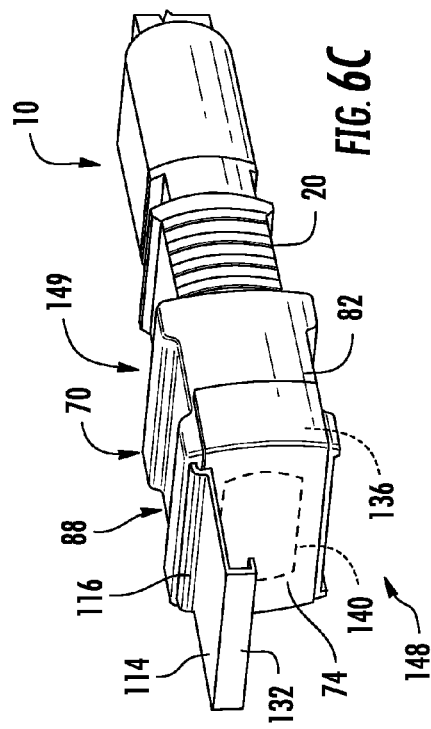

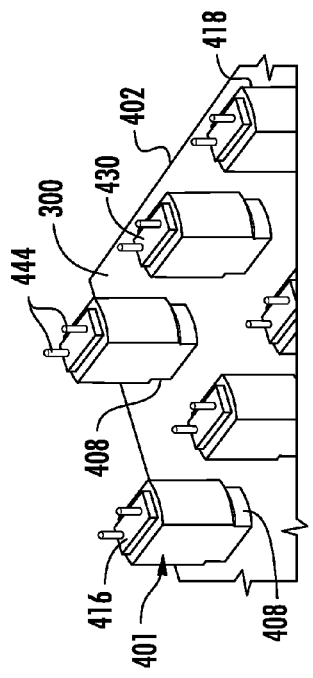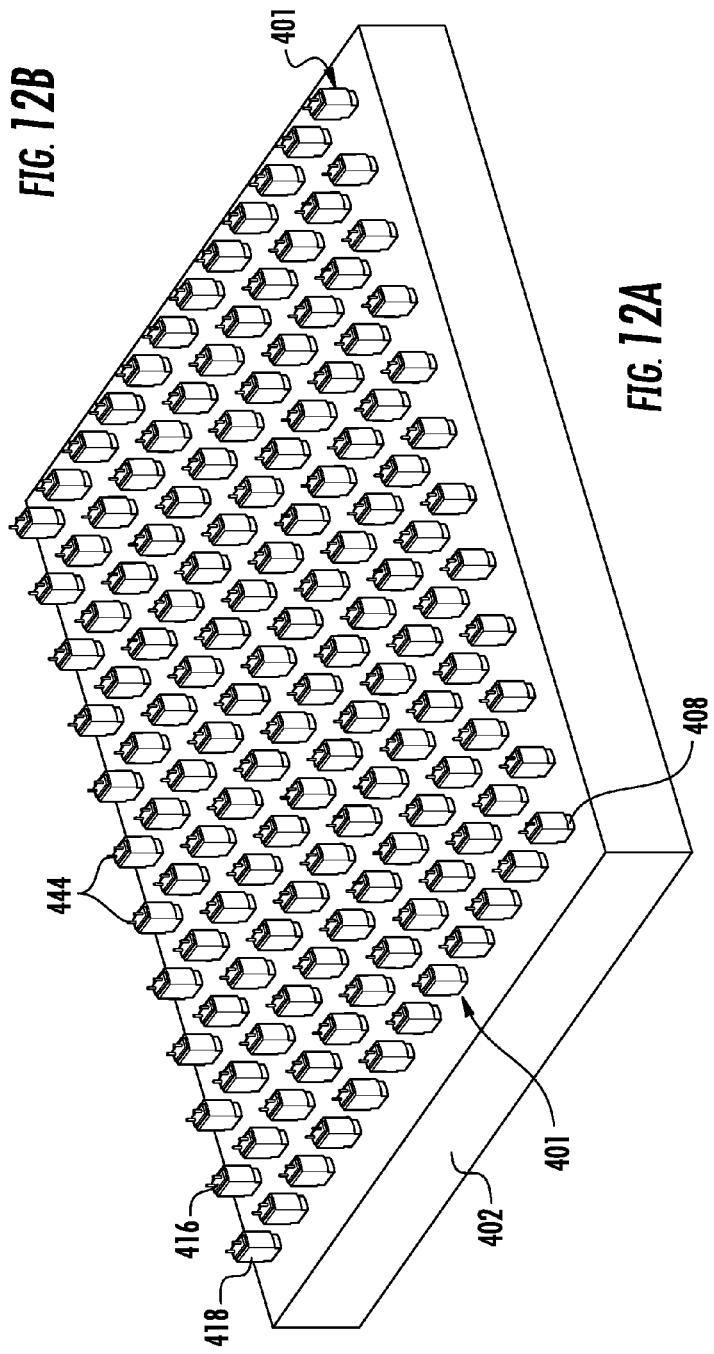

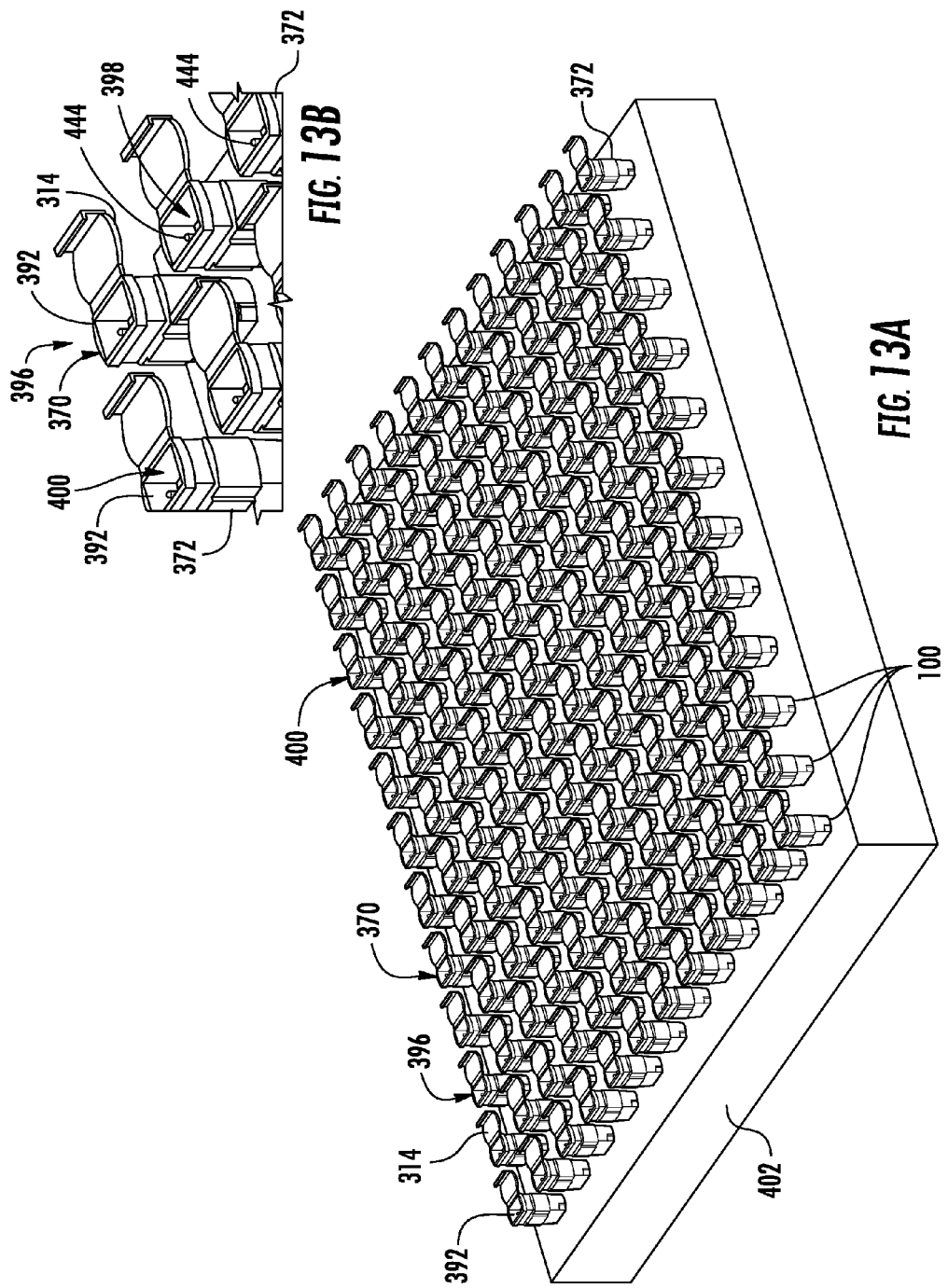

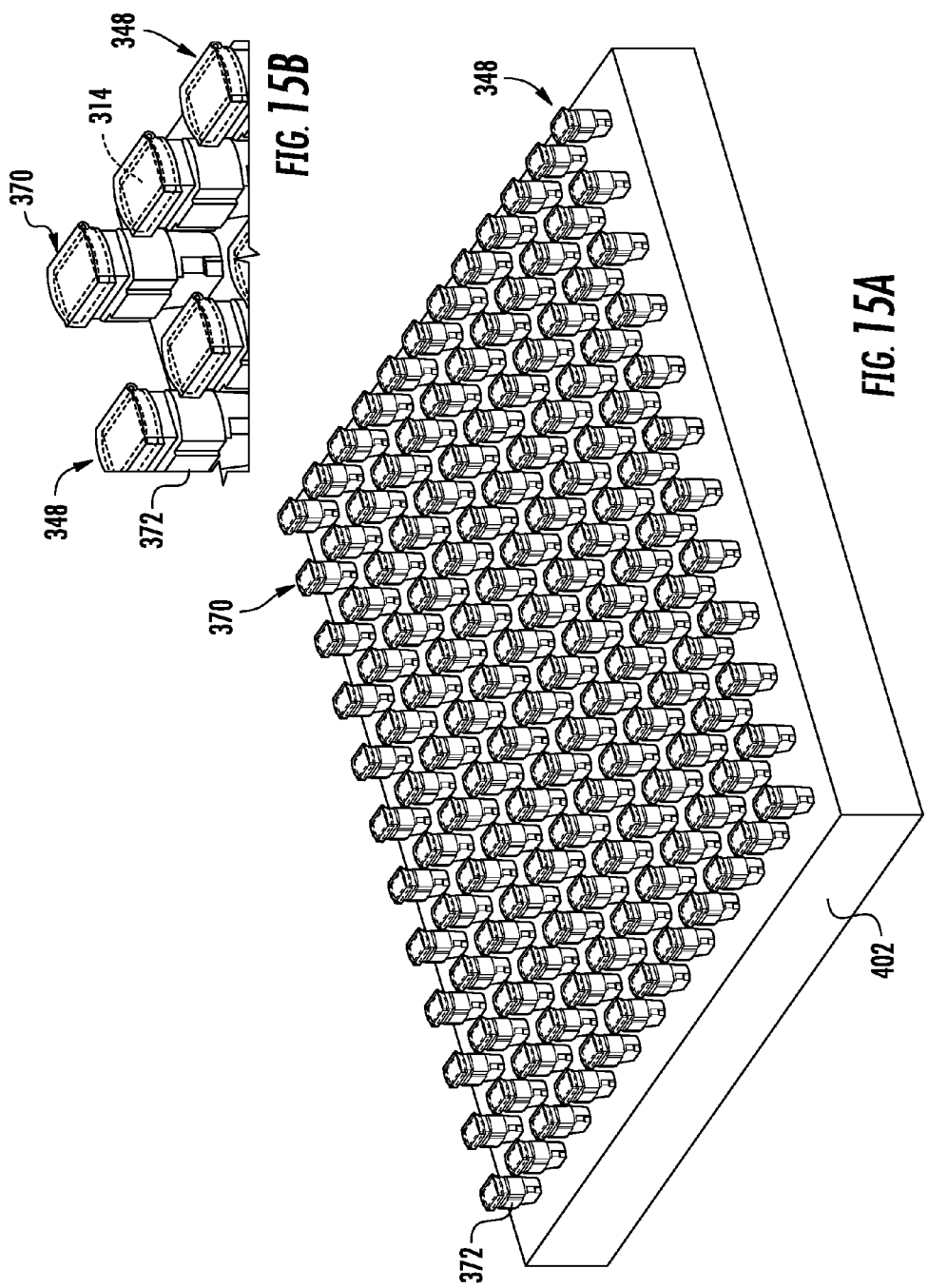

FIBER OPTIC CABLE ASSEMBLIES WITH CAP APPARATUSES FOR SEALING OPTICAL FIBER CONNECTORS AND ASSOCIATED METHODS

PRIORITY APPLICATIONS

This application claims the benefit of priority of U.S. Provisional Application Ser. No. 62/167,957, filed on May 29, 2015, and European Patent Application No. 15173169, filed on Jun. 22, 2015, the contents of both applications being relied upon and incorporated herein by reference.

BACKGROUND

This disclosure generally relates to optical fibers and, more particularly, to cleaning and sealing optical fiber connectors.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, substantially fixed location relative to the housing. This allows an optical communication to be established when the optical fiber is aligned with another optical fiber provided in the mating component (the other fiber optic connector or adapter).

Dust caps are typically applied to fiber optic connectors in the manufacturer's factory to protect the precision mating surfaces from damage and contamination between the time that the connector leaves the manufacturing line and is in the hands of the installer. In some situations, dust caps may address physical damage protection more so than the contamination protection. As a result, contaminated connectors may be delivered to the installation point, and a field cleaning process may be required prior to installation.

SUMMARY

In general, one aspect of this disclosure is directed to caps, cap apparatuses, seals, and sealing apparatuses for protecting end faces of ferrules of optical fiber connectors. For example, a fiber optic cable assembly may include a cable having at least one optical fiber; at least one fiber optic connector mounted on an end of the cable, wherein the fiber optic connector has a ferrule through which the at least one optical fiber extends; a cap apparatus mounted to at least a portion of the fiber optic connector for protecting at least an end face of the ferrule; and a sealing apparatus. The cap apparatus may include a body having opposite proximal and distal ends between which a cavity extends, wherein the proximal end defines a first opening to the cavity, the distal end defines a second opening to at least a portion of the cavity, and at least a portion of the fiber optic connector extends through the first opening and into the cavity so that the end face of the ferrule is positioned closer to the second opening than the first opening. The cap apparatus may also include a cover mounted to the body and at least partially obstructing the second opening, wherein the end face of the ferrule is positioned within the cavity at a location spaced from the cover. The sealing apparatus may be positioned between at least a portion of the cover and the end face of the ferrule, wherein the sealing apparatus seals at least a portion of the cavity, and the cover extends at least partially around the sealing apparatus.

The cover may include a fastener securing the cover to the body. The cover may extend into the cavity of the body. The cover may be movably mounted to the body, such as by being pivotably connected to the body, so that the cover is movable between open and closed configurations. In the closed configuration, the cover at least partially obstructs the second opening. In the open configuration, at least a portion of the cover may be farther away from the second opening than when the cover is in the closed configuration.

The sealing apparatus may comprise an area of adhesive material that confronts the end face of the ferrule and is spaced apart from the end face of the ferrule. The sealing apparatus may comprise adhesive tape, and the adhesive tape may include the area of adhesive material. The adhesive tape may be mounted to the body and at least partially obstruct the second opening.

At least a portion of the sealing apparatus may be engaged against the end face of the ferrule. The sealing apparatus may comprise a plug, which may be engaged against the end face of the ferrule. The plug may extend at least partially around the end face of the ferrule. The plug may have a modulus of elasticity that is greater than the modulus of elasticity of the body of the cap apparatus. An area of adhesive material may be connected to the plug and engaged against the end face of the ferrule.

The sealing apparatus may comprise a mechanical seal configured for restricting any particle migration between the cover and the body. The mechanical seal may comprise a gasket positioned between the cover and the body of the cap apparatus. The mechanical seal may comprise an annular groove of a first component selected from the group consisting of the body and cover, and an annular protrusion of a second component selected from the group consisting of the body and cover, wherein the groove and the protrusion are configured for mating with one another. The mechanical seal may comprise packing positioned between the cover and the body. The packing may be positioned at least partially in a groove, and the groove may be at least partially defined by either the body or the cover.

In accordance with an embodiment of this disclosure, a fiber optic cable assembly may include a cable having at least one optical fiber; at least one fiber optic connector mounted on an end of the cable, wherein the fiber optic connector has a ferrule through which the at least one optical fiber extends; a cap apparatus mounted to at least a portion of the fiber optic connector for protecting at least an end face of the ferrule; and a sealing apparatus. The cap apparatus may include a body having opposite proximal and distal ends between which a cavity extends, wherein the proximal end defines a first opening to the cavity, the distal end defines a second opening to at least a portion of the cavity, and at least a portion of the fiber optic connector extends through the first opening and into the cavity. The cap apparatus may also include a cover mounted to the body and at least partially obstructing the second opening, wherein the end face of the ferrule may be positioned within the cavity at a location spaced from the cover. The sealing apparatus may be positioned between at least a portion of the cover and the end face of the ferrule, wherein the sealing apparatus seals at least a portion of the cavity, and the sealing apparatus comprises an area of adhesive material that confronts the end face of the ferrule and is spaced apart from the end face of the ferrule. The sealing apparatus may comprise adhesive tape that includes the area of adhesive material. The adhesive tape may be mounted to the body of the cap apparatus and at least partially obstruct the second opening.

In an embodiment of this disclosure, a fiber optic cable assembly may comprise a cable having at least one optical fiber; at least one fiber optic connector mounted on an end of the cable, wherein the fiber optic connector has a ferrule through which the at least one optical fiber extends; and a cap apparatus mounted to at least a portion of the fiber optic connector for protecting at least an end face of the ferrule. The cap apparatus may include a body having opposite proximal and distal ends between which a cavity extends, wherein the proximal end defines a first opening to the cavity, the distal end defines a second opening to the cavity, and at least a portion of the fiber optic connector extends through the first opening and into the cavity so that the end face of the ferrule is spaced from each of the first and second openings. Adhesive tape may be mounted to the body of the apparatus so that the adhesive tape at least partially obstructs the second opening. The adhesive tape may include an area of adhesive material that both confronts the end face of the ferrule, and is spaced apart from the end face of the ferrule. The second opening may be sealed closed by the adhesive tape.

In another embodiment, a fiber optic cable assembly may include a cable having at least one optical fiber; at least one fiber optic connector mounted on an end of the cable, wherein the fiber optic connector has a ferrule through which the at least one optical fiber extends; a cap apparatus mounted to at least a portion of the fiber optic connector for protecting at least an end face of the ferrule; and a sealing apparatus. The cap apparatus may include a body having opposite proximal and distal ends between which a cavity extends, wherein the proximal end defines a first opening to the cavity, the distal end defines a second opening to at least a portion of the cavity, and at least a portion of the fiber optic connector extends through the first opening and into the cavity. The cap apparatus may further include a cover mounted to the body and at least partially obstructing the second opening, wherein the end face of the ferrule is positioned within the cavity at a location spaced from the cover. The sealing apparatus may be positioned between at least a portion of the cover and the end face of the ferrule. The sealing apparatus may seal at least a portion of the cavity, and a portion of the sealing apparatus may be engaged against the end face of the ferrule. The sealing apparatus may comprise a plug having a modulus of elasticity that is greater than the modulus of elasticity of the body of the cap apparatus. The plug may extend at least partially around the end face of the ferrule. An area of adhesive material may be connected to the plug and engaged against the end face of the ferrule.

Methods of using and forming fiber optic cable assemblies, including the fiber optic cable assemblies mentioned above, are also disclosed. One embodiment of such a method includes mounting a body of a cap apparatus to a fiber optic connector so that at least a portion of the fiber optic connector extends through a first opening of a body of the cap apparatus. The body has opposite proximal and distal ends between which a cavity extends, the proximal end defines the first opening to the cavity, and the distal end defines a second opening to the cavity. The method also involves cleaning at least an end face of a ferrule of the fiber optic connector while the body is mounted to the fiber optic connector, and sealing closed the cavity of the cap apparatus with a sealing apparatus so that at least the cleaned end face of the ferrule is positioned in the sealed closed cavity.

The cleaning may further include cleaning at least a portion of the body and/or the sealing apparatus. The sealing closed may be comprised of at least partially obstructing the second opening of the body with the sealing apparatus, and may be further comprised of at least partially covering the sealing apparatus with a cover element of the cap apparatus.

Another aspect of this disclosure is the provision of a method for at least partially making a cap apparatus configured for being mounted to at least a portion of a fiber optic connector for protecting at least an end face of a ferrule of the fiber optic connector. This method may include mounting a body of the cap apparatus to a mold tool, wherein the body defines an interior cavity and an opening to the interior cavity, and the mounting is comprised of causing relative movement between the body and the mold tool so that the mold tool extends through the opening, and an end face of the mold tool is positioned in the interior cavity so that a mold cavity is at least partially defined by the end face of the mold tool within the interior cavity of the body. The method further includes forming a plug of the cap apparatus in the mold cavity while the end face of the mold tool is positioned in the interior cavity of the body; and separating the cap apparatus and the mold tool from one another.

The opening to the interior cavity may be a first opening to the interior cavity of the body of the cap apparatus, and the body of the cap apparatus may further define a second opening to the interior cavity. The end face of the mold tool may be positioned between opposite first and second openings of the body of the cap apparatus, so that the mold cavity is a portion of the interior cavity of the body of the cap apparatus. The forming of the plug may include depositing molding material in the mold cavity through the second opening to the interior cavity, and then curing the molding material. At an appropriate time, such as after forming the plug in the mold cavity, the second opening may be obstructed with a cover of the cap apparatus. The method may further include mounting the cap apparatus to the optical fiber connector, so that at least a portion of the optical fiber connector extends through the first opening into the interior cavity of the body of the cap apparatus.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

FIG. 4 is a perspective view of a combination of the connector and a cap apparatus of a first version of the first embodiment, wherein the cap apparatus includes the cap and a sealing apparatus comprising a mechanical seal with packing, or the like.

FIG. 5 is a perspective view of a combination of the connector and a cap apparatus of a second version of the first embodiment, wherein the cap apparatus includes the cap and a sealing apparatus comprising a gasket that may be in the form of adhesive tape, or the like.

FIGS. 6A-6D are perspective views of a sequence of steps that comprise methods of cleaning and forming the combination of FIG. 5.

FIGS. 12A-15B are perspective views of that illustrate aspects of a sequence of steps that comprise a method of forming the cap apparatus of FIGS. 11A and 11B, wherein FIG. 12B is an enlarged portion of FIG. 12A, FIG. 13B is an enlarged portion of FIG. 13A.

DETAILED DESCRIPTION

Various embodiments will be further clarified by examples in the description below. As an example, this description generally relates to cleaning predetermined portions of an optical fiber connector and/or attaching a cap apparatus to the optical fiber connector for maintaining cleanliness of at least a front end face of a ferrule of the fiber optic connector.

Figure 1:
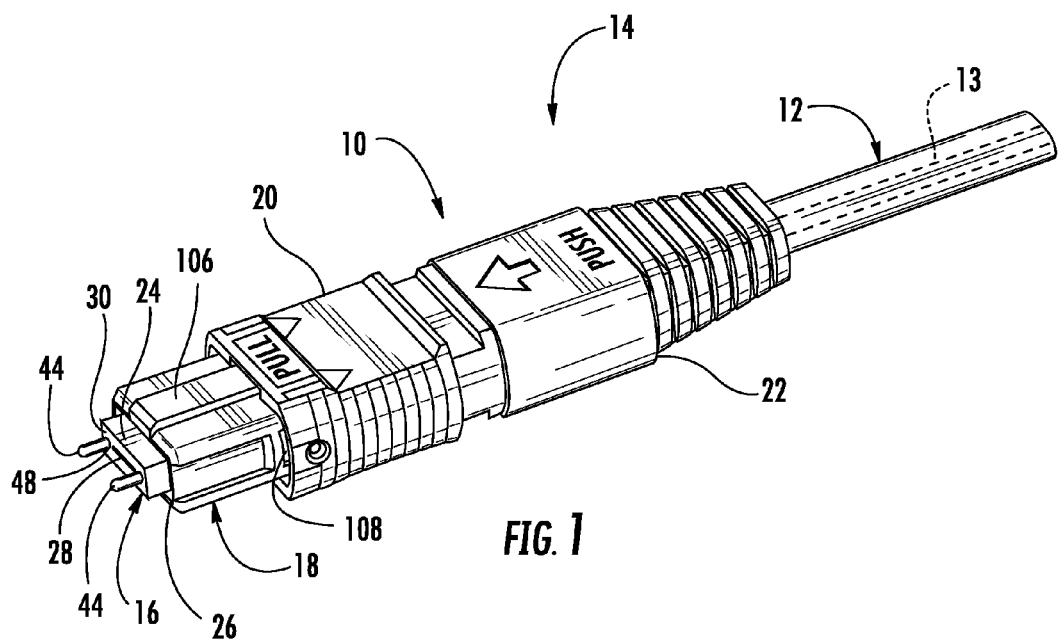
FIG. 1 is a perspective view of an example of a fiber optic cable assembly that includes a fiber optic connector.
Figure 2:
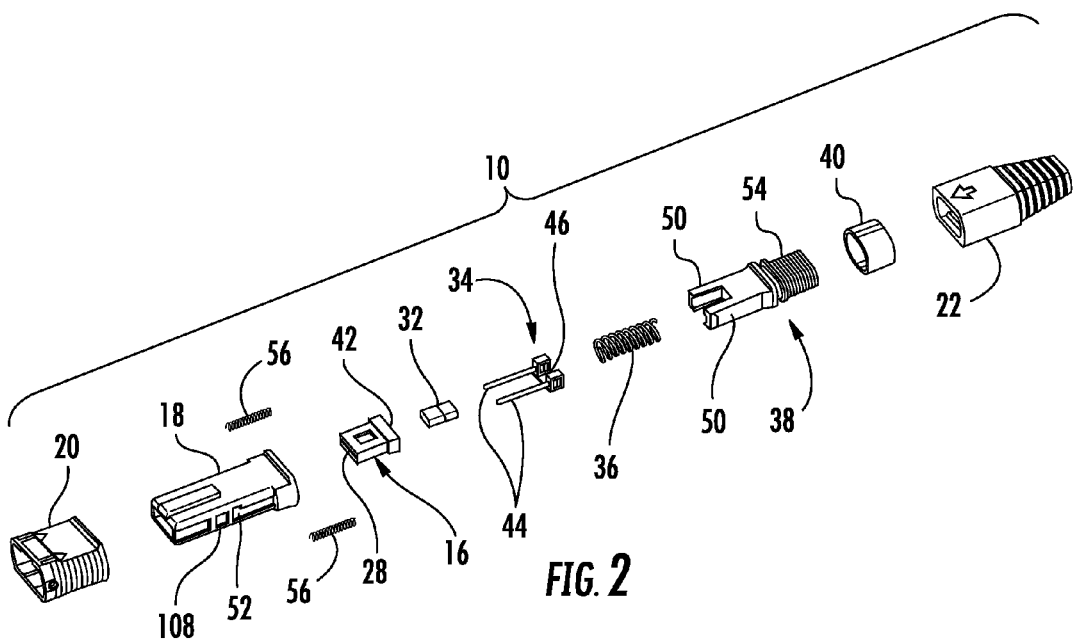
FIG. 2 is an exploded perspective view of the connector of FIG. 1.

One example of a fiber optic connector ("connector") 10 is shown in FIGS. 1 and 2, and this type of connector may be referred to as a multi-fiber push on (MPO) connector, which includes a push-pull latch, and incorporates a mechanical transfer (MT) ferrule. These connectors can achieve a very high density of optical fibers, which reduces the amount of hardware, space, and effort to establish a large number of interconnects. A general discussion of the connector 10 will be provided, followed by a discussion of, for example a cap 70 (FIGS. 3A-3C) and associated sealing apparatuses and methods. Although the connector 10 is shown in the form of a MPO-type connector, the caps, sealing apparatuses, and methods described below may be applicable to different fiber optic connector designs, such as SC, ST, LC, and other single fiber or multifiber connector designs, and different types of fiber optic cable assemblies.

As shown in FIG. 1, the connector 10 may be installed on a fiber optic cable ("cable") 12 to form a fiber optic cable assembly 14. The connector 10 includes a ferrule 16, a housing 18 received over the ferrule, a slider 20 received over the housing, and a boot 22 received over the cable 12. The ferrule 16 is spring-biased within the housing 18 so that a front portion 24 of the ferrule extends beyond a front end 26 of the housing. Optical fibers ("fibers") 13 carried by the cable 12 extend through respective bores 28 in the ferrule 16 before terminating at or near a front end face 30 of the ferrule. There may be a single row of twelve bores 28, although it is within the scope of this disclosure for there to be a greater or lesser number of each of the rows and bores. The fibers 13 are secured within the ferrule 16 using an adhesive material (e.g., epoxy) and can be presented for optical coupling with fibers of a mating component (e.g., another fiber optic connector, not shown) when the housing 20 is inserted into an adapter, receptacle, or the like.

As shown in FIG. 2, the connector 10 further includes a ferrule boot 32, guide pin assembly 34, spring 36, retention body ("crimp body") 38, and crimp ring 40. The ferrule boot 32 is received in a rear portion 42 of the ferrule 16 to help support the fibers extending to the bores 28. The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (FIG. 1) provided in the ferrule 16 so as to project beyond the front end face 30. The presence of the guide pins 44 means that the connector 10 is in a male configuration. In a female configuration the guide pins 44 are not present. As another example, the guide pin assembly 34 may be omitted, such as when other provisions may be made for alignment, as may be the case when the ferrule 16 includes molded-in post and hole alignment features.

Both the ferrule 16 and guide pin assembly 34 (if present) are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled. The crimp body 38 includes latching arms 50 that engage recesses 52 in the housing 18. The spring 36 is compressed by this point and exerts a biasing force on the ferrule 16, such as via the pin keeper 46.

The rear portion 42 of the ferrule 16 defines a flange that interacts with a shoulder or stop formed within the housing 18 to retain the rear portion 42 within the housing 18.

In a manner not shown in the figures, aramid yarn or other strength members from the cable 12 may be positioned over a rear end portion 54 of the crimp body 38 that projects rearwardly from the housing 18. The aramid yarn can be secured to the end portion 54 by the crimp ring 40, which is slid over the end portion 54 and deformed after positioning the aramid yarn. The boot 22 covers this region, as shown in FIG. 1, and provides strain relief for the fibers by limiting the extent to which the connector 10 can bend relative to the cable 12.

Variations of these aspects will be appreciated by persons skilled in the design of fiber optic cable assemblies. Again, the embodiment shown in FIGS. 1 and 2 is merely an example of a fiber optic connector that may be used in the assemblies and methods described below. The general overview has been provided simply to facilitate discussion.

Figure 3A:
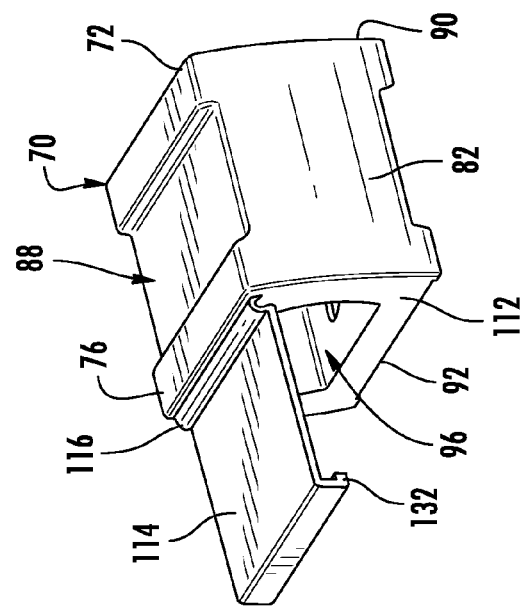
FIGS. 3A-3C are perspective views of a cap according to a first embodiment of the disclosure.
Figure 3B:
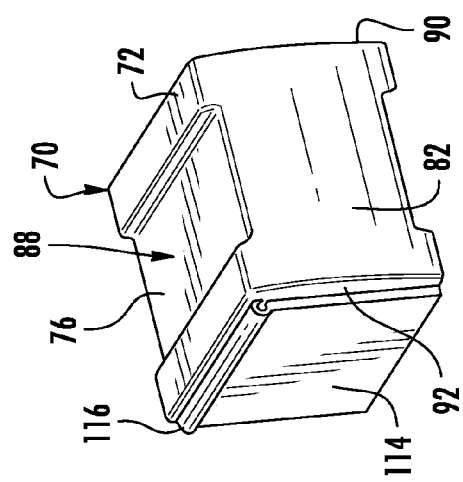
Figure 3C:
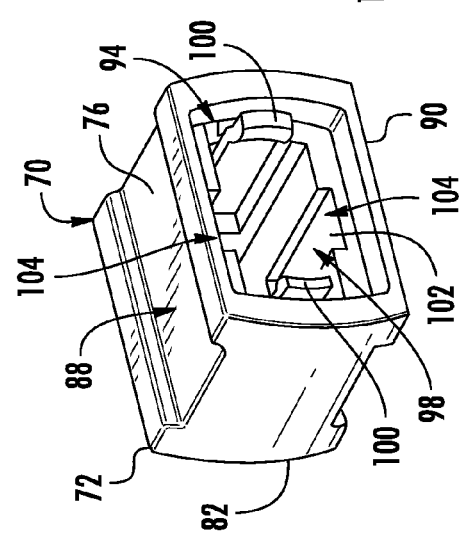

FIGS. 3A-3C illustrate a first embodiment of a cap 70 for covering the distal end of the connector 10 to protect the precision mating surfaces, such as the end face 30 of the ferrule 16, from damage and contamination. The cap 70 may have a generally rectangular body 72 (also referred to as "cap body 72") including a top 76, a bottom 78, a first side 82, and a second side 84. The top 76 and the bottom 78 may include shoulders that at least partially define a step feature or indentation 88 provided therein to enable an installation personnel's finger, a tool, or the like, to grip the exterior surface of the body to apply and/or remove the cap 70 from the connector 10. The body 72 and the step feature 88 are not limited to only the embodiment shown and may be alternatively shaped or configured without departing from this disclosure.

As illustrated in FIG. 3C, the cap body 72 has a proximal end 90 (or "first end") and a distal end 92 (or "second end") opposite the proximal end. Each of the proximal end 90 and the distal end 92 respectively comprise an opening 94, 96. An internal passageway, channel, and/or cavity 98 extends between the first opening 94 and the second opening 96 to generally form a sleeve. The cavity 98 may include a guide section 102 having grooves 104 configured to receive and mate with protrusions or guide features 106 in the housing 18 of the connector 10. Thus, although the cavity 98 may form a sleeve, it need not closely receive the ferrule 16 of the connector 10, unlike the sleeve of an adapter or the like. The body 72 does not contact the ferrule 16 in the embodiment shown and in at least some other embodiments.

The cap body 72 is configured for being mounted to and at least partially holding the connector 10. For example, the guide section 102 may include at least one shoulder or back stop 130 (FIG. 7), or the like. The back stop 130 is located at a predetermined position in the cavity 98. When the connector 10 is inserted into the proximal opening 94 of the cap body 72, the front end 26 (FIG. 1) of the connector housing 18 may contact the back stop 130 to prevent the connector and the end face 30 of the ferrule 16 from further movement into the cavity 98. In addition, the proximal end 90 may also include mechanical retention clips or latches 100 that are integral with the body 70 and are configured to mate with the existing retention features on the housing 18 of the connector 10, such as recesses 108 (FIGS. 1 and 2) in the sides of the housing 18. Inner ends of the latches 100 are connected to the interior structure of the cap body 72 so that the outer ends of the latches may be moved in a cantilevered manner.

In the first embodiment, the distal end 92 includes a front or distal surface 112, and at least one outer closure element or cover 114 is connected to the front surface 112 along a hinge 116. The cover 114 may be configured to at least partially or completely cover or obstruct the opening 96 and close or seal the cavity 98. The cap 70 may be part of a cap apparatus that further includes a sealing apparatus. A variety of sealing apparatuses are within the scope of this disclosure, as discussed in greater detail below. In general, the sealing apparatuses are configured in a manner that seeks to block the transport of contaminates at least to the end face 30 of the ferrule 16. In accordance with the first embodiment and as will be described in greater detail below, the front surface 112 and the interior surface 120 of the cover 114 may include feature(s) and/or be associated with element(s) that form a mechanical seal that seeks to prevent contamination of the cavity 98 by moisture, dust, or any other particles or debris that could enter the cavity 98 and require cleaning before use.

Figures 4, 5:
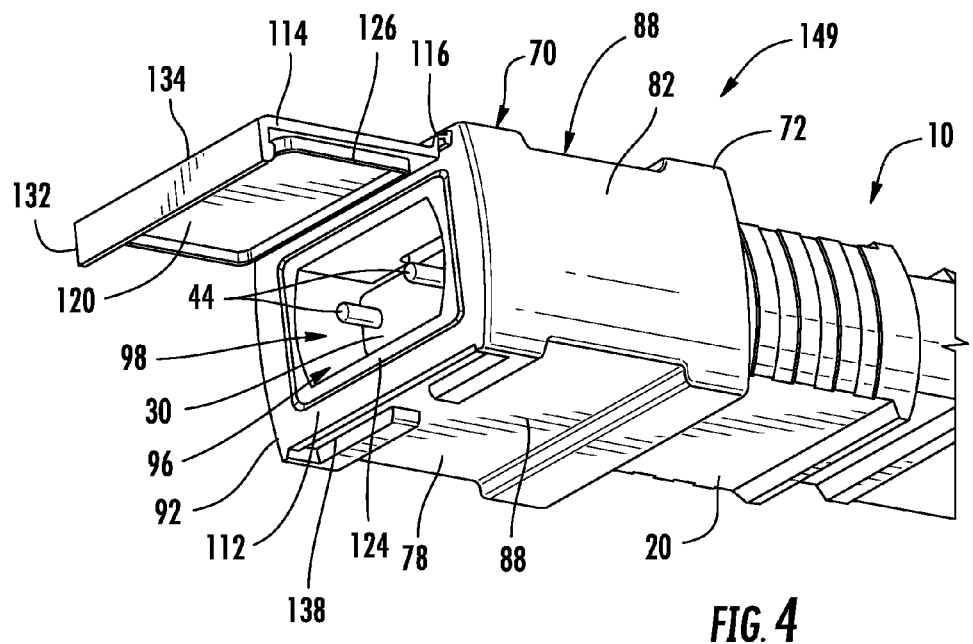

As illustrated in FIG. 4, the features of the mechanical seal may include at least one recess or annular groove 124 that is defined in the front surface 112 and circumscribes the opening 96, and at least one packing element 126 configured for extending at least partially into the annular groove 124. In the example shown in FIG. 4, the packing element 126 is in the form of an annular packing protrusion extending inwardly from the interior surface of the cover 114. The packing protrusion may be formed integrally with the cover 114. In the embodiment shown in FIG. 4, the packing element 126 is configured to mate with the annular groove 124 to form the seal such that the seal is configured to prevent moisture, debris and other contaminates from entering the cavity 98. In alternative embodiments, the packing element 126 may be a length of conventional packing material, an o-ring, or any other suitable packing formed separately from the cover 114.

The groove 124 and packing element 126 may be collectively referred to as a sealing apparatus. The sealing apparatus may be alternatively arranged, configured, or the like, without departing from the disclosure. For example, the annular groove 124 may be in the cover 114 and the packing protrusion 126 may be in the front surface 112. In addition or alternatively, the mechanical seal may comprise a gasket, O-ring type, labyrinth seal and/or any other suitable seal.

Still referring to FIG. 4, the body 72 of the cap 70 may be manufactured via a molding process from a plastic material. The material can be chosen to minimize or eliminate static electricity that could act to charge the optical connector components. As illustrated in FIG. 4, the outer cover 114 may be integrally formed with the cap body 72 and the hinge 116 may be a living hinge made of the same material as the body 72, or alternatively the hinge 116 may be made of a different material than the body 72. In one exemplary embodiment, the hinge 116 is connected to the front surface 112, however the hinge 116 may be connected to the body 72 along the top 76, bottom 78, or sides 82, 84. The hinge 116 may be a continuous hinge, a barrel hinge, a butt/Mortise hinge, and/or any other suitable hinge(s) that allow the cover 114 to swing or pivot from an open position to a closed position. As another example, the outer cover 114 may be formed separately from the cap body 72 and then be connected to the cap body with one or more connectors or fasteners, as will be discussed in greater detail below.

As illustrated in FIGS. 3C and 4, the cap 70 may have a first or open configuration wherein the cover 114 is spaced apart from the front surface 112 of the distal end 92 for allowing access to the interior passageway or cavity 98 of the cap body 72, and a second or closed configuration wherein the cover 114 is substantially proximate or in face-to-face contact with the front surface 112 of the distal end 92 of the cap body 72. To secure the cover 114 in the closed configuration, the cover 114 may include one or more fasteners, such as an attachment clip or lip 132 that extends from the edge of bottom end 134 of the cover. The lip 132 is configured to mate with a recess 138 in the bottom surface 78 of the exterior of the cap body 72. In the first embodiment, while the cap 70 is secured closed, the cap at least partially covers and protects the sealing apparatus 124, 126 in a manner that seeks to maintain and protect the functionality of the sealing apparatus. As a more specific example, the secured closed cap 70, at least by virtue of its attachment clip or lip 132, extends at least partially around the sealing apparatus 124, 126 in a manner that seeks to maintain and protect the functionality of the sealing apparatus.

As illustrated in FIGS. 5, 6C, 6D and 7, the cap apparatus may alternatively include a sealing apparatus 74 ("inner closure element") configured to at least partially or completely cover or obstruct the opening 96 and close or seal the cavity 98. Thus, like the sealing apparatus 124, 126, the sealing apparatus 74 may be positioned between the front surface 112 of the cap body 72 and the interior surface 120 of the cover 114 for restricting any contamination of the cavity 98 by moisture, dust, or any other particles or debris that could enter the cavity 98. In the embodiment shown, the sealing apparatus 74 comprises a membrane or sealing film 142 configured to at least partially cover and further seal any migration path for debris through the opening 96 in the distal end 92 of the body 72. The sealing apparatus 74 may further include a gel or adhesive layer 144 (FIG. 7) carried by the sealing film 142 for attaching the sealing film in face-to-face contact with one or more portions of the cap body 72. In particular, the gel or adhesive layer may attach the sealing film 142 to at least one of the following: the first side 82, second side 84, distal surface 92, or the bottom 78 of the cap body 72. The gel or adhesive layer 144 may also be configured for trapping/capturing contaminations that may seek to migrate into the cavity 98 or that may have been left inside the cap after the cleaning process. For example, the sealing apparatus 74 may be an adhesive tape that includes the sealing film 142 and adhesive layer 144. In one example, a durably suitable adhesive tape for use as the sealing apparatus 74 may be selected from conventional adhesive tapes. The cap 70 with the sealing apparatus 74 may be referred to as a cap apparatus 148.

Figure 7:
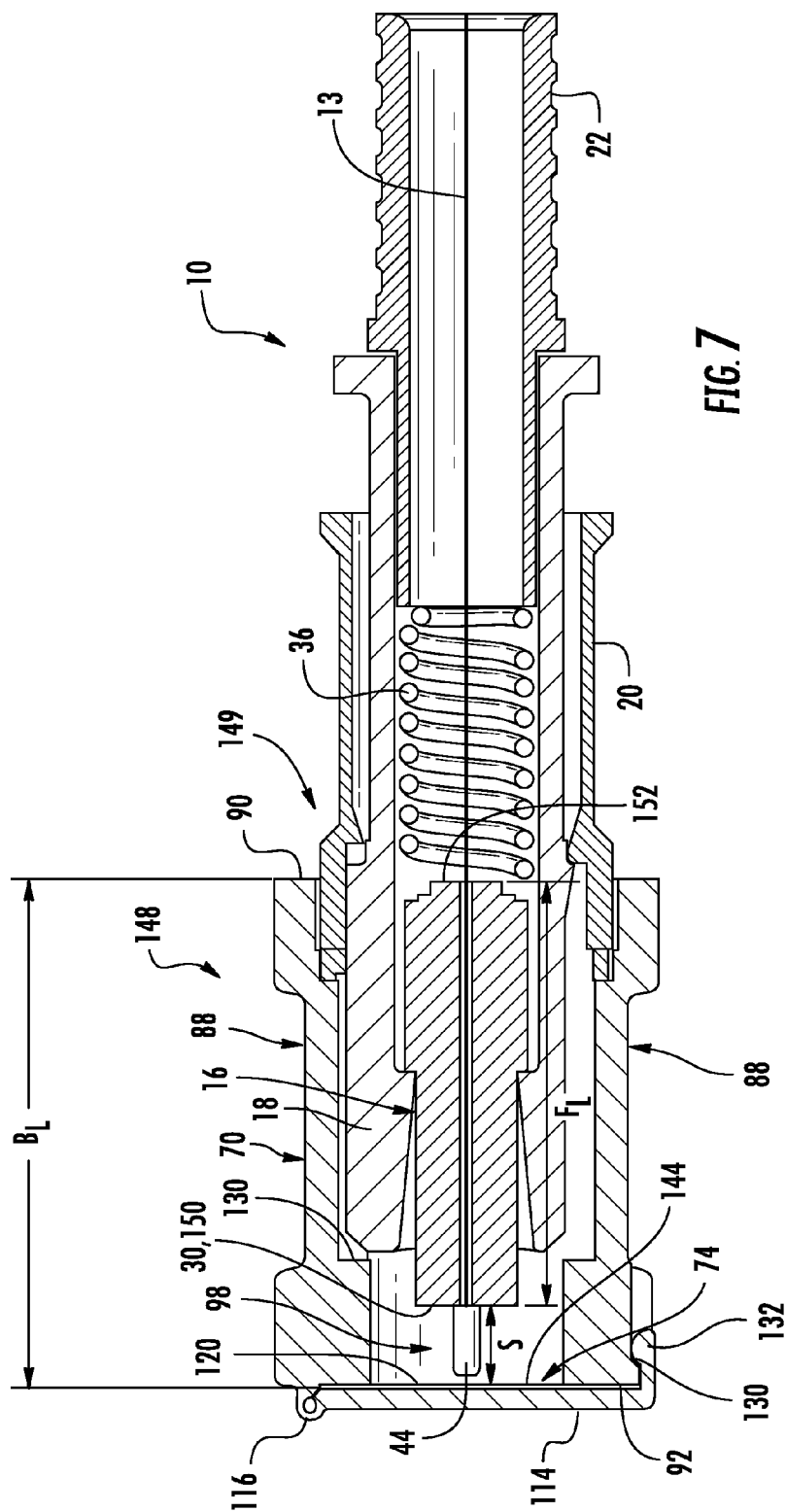
FIG. 7 is a schematic cross-sectional view of a portion of the combination of FIG. 5, wherein the cross-section is taken along line 7-7 of FIG. 5.

As illustrated in FIG. 7, the sealing apparatus 74 is spaced apart from the front end face 30 of the ferrule 16. The end face 30, however, remains relatively close to the distal end 92 of cap body 72 and to the cover 114. That is, the connector 10 extends through the first opening 94 (FIG. 3A) and into cavity 98 so that the end face is positioned closer to the second opening 96 (FIG. 3C) than the first opening. In some embodiments, at least a portion of the connector 10 may extend at least 60%, or even at least 80%, through the cavity 98 of cap body 72.

The position of the end face 30 relative to the cap apparatus 148 may be expressed in a variety of alternative ways. For example, as shown in FIG. 7, the cap body 72 has a length $B_L$ between the proximal and distal ends 90, 92. In some embodiments, the end face 30 may be spaced from the cover 114 by a distance S that is less than 50%, or even less than 25%, of the length $B_L$. FIG. 7 also illustrates the ferrule 16 having a front end 150 defining the end face 30, a back end 152 opposite the front end, and a length $F_L$ between the front and back ends 150, 152. In some embodiments, the end face 30 may be spaced from the cover by a distance S that is less than 50%, or even less than 25%, of the length $F_L$. Alternatively or additionally, in some embodiments the distance S may be less than 5 mm. As an example, the distance S may be between 0.1 millimeters (mm) and 2.5 mm. It will be appreciated that these various ways of characterizing the position of the end face 30 relative to the cap apparatus 148 are not specific to the embodiment shown in FIG. 7 and may apply to other embodiments.

Still referring to FIG. 7, the adhesive layer 144 may include any adhesive material that is effective for causing any loose particles inside the cavity 98 to become secured to the sealing film 142 without concern for leaving adhesive residue on the front end face 30 of the ferrule 16. As schematically shown in FIG. 6C, in some embodiments the sealing apparatus 74 may include a gel or adhesive layer comprised of a first region 136 with a first adhesive material for attaching the sealing film to the exterior of the cap body 72 and a second region 140 with a second adhesive material, different from the first adhesive material, for trapping particles that are inside the cavity 98. For example, the second region 140 may comprise a stronger adhesive material than the first region 136. Alternatively, the first region 136 may comprise a stronger adhesive material than the second region 140. Regardless of whether the adhesive layer includes a single adhesive material or different regions of different adhesive materials, the adhesive layer may provide at least an area of adhesive material that confronts (e.g., be in opposing face-to-face relation with) the front end face 30 of the ferrule 16, yet is also spaced apart from the front end face of the ferrule. Any particulate contaminants may become attached to the area of adhesive material such that the adhesive material may provide a cleaning function.

The sealing apparatus 74 may be made from materials that minimize or eliminate contamination to the connector 10 and the ferrule 16 resulting from environmental effects and/or aging effects such as outgassing. The sealing film 142 may be made from materials including metal foil applied via induction sealing, plastic film applied via heat shrink processes, or tapes or films applied with adhesives. In one embodiment, the sealing film 142 may be made from an optically translucent or transparent material that allows for visual inspection of light transmission through the sealing film when the outer cover 114 is open thus allowing visual inspection without the removal of the cap 70 from the connector 10. The outer cover 114, and perhaps the body 72, may be opaque in such an embodiment such that the aforementioned visual inspection is only possible when the outer cover 114 is open. Alternatively, the material of the outer cover 114 could also be translucent or transparent for allowing visual inspection of light transmission through the sealing film 142 and the outer cover 114 when the outer cover 114 is closed.

A method of forming the combination 149 of the connector 10 and at least the cap 70 will now be described, as will a method of using the formed combination. With reference to FIGS. 1, 2, 3A, and 6A-6D, the connector 10 having the ferrule 16 is provided. The end face 30 of ferrule 16 is inserted into the opening 94 in the proximal end 90 of the cap body 72 until the front end 26 of the housing 18 abuts the back stop 130 and/or the latches 100 mate with the recesses 108 (FIGS. 1 and 2) in the sides of the housing 18 to secure the cap 70 to the connector 10. This results in the end face 30 of the ferrule 16 being positioned within the cavity 98 a predetermined distance from each of the first and second openings 94, 96 (see discussion above about the relative position of the end face and cap apparatus 148).

Before or after the cap 70 is mounted to the connector 10, the outer cover 114 may be opened, i.e. moved to its open configuration (FIG. 6A). After the cap 70 has been mounted to the connector 10 and while the outer cover 114 is open, the cleaning process may be conducted, such as by providing (e.g., spraying) a cleaning fluid into the cavity 98, as schematically shown in FIG. 6B. Pressurized air, water, chemical solutions, or any other suitable cleaning agents may be used to clean the combination 149, specifically inside the portion of the cavity 98 that extends forwardly from the end face 30 of the ferrule 16. Some examples of other cleaning methods known in the art include ultrasonic cleaning, agitated bath, and clean/dry high purity gas processing. A drying step may be included for some of the cleaning methods that utilize liquids. For example, the drying step may allow and/or cause dry air or other suitable gas(es) to flow into the open portion of the cavity 98. For drying and/or other purposes, ionized air may be included to help neutralize any static charge effects before mounting the sealing film 142 to the cap 70.

After the surfaces of the connector 10 that are accessible by way of the open portion of cavity 98 are clean from substantially all debris and any other contamination, the sealing apparatus 74 may be applied to the distal end 92 of the cap body 72 for obstructing, or more specifically closing and sealing the opening 96, as shown in FIG. 6C. After the sealing apparatus 74 is applied, the cover 114 may be moved to its closed position (FIG. 6D). At this point the sealing apparatus 74 and the opening 96 are at least partially, substantially, or completely covered by the outer cover 114 to further seal the opening 96 of the cap body 72. The cap 70, which is secured closed at least by virtue of its fastener clip or lip 132, extends at least partially around the sealing apparatus 74 in a manner that seeks to maintain and protect the functionality of the sealing apparatus.

As discussed above, the sealing apparatus 74 may be adhesive tape, or the like, that is applied to the distal end 92 of the cap body 72, for obstructing, or more specifically closing and sealing, the opening 96. Alternatively, the sealing apparatus 74 may be in the form of a sealing plug, as discussed in greater detail below. For example, after the surfaces of the connector 10 that are accessible by way of the open portion of cavity 98 in FIG. 6B are substantially clean, the sealing plug may be inserted through the opening 96 into the chamber 98. The sealing plug in such an embodiment may not only confront (e.g., be in opposing face-to-face relation with) the front end face 30 of the ferrule 16, but may also conformingly engage the front end face of the ferrule. Again, these and other aspects will be discussed in greater detail below.

Referring back to FIG. 6D, the cap apparatus 148 may be removed from the connector 10 after the cavity 98 of the body 72 has been sealed closed for a period of time. For example, when the combination 149 of the connector 10, cap 70, and sealing apparatus 74 reaches the destination where the connector is to be installed, the cap may be manually removed from the connector, such as by manually pulling the slider 20 (FIGS. 1 and 2) of the connector rearwardly, and then by overcoming the bias of the latches 100 of the cap. During removal of the cap 70, the cover 114 may remain closed and the sealing apparatus 74 may remain fixedly connected to the cap, so that the sealing apparatus is removed with the cap. The reason the cap 70 (or, more generally, cap apparatus 48) is removed may be for mating purposes with a second connector (not shown), as the cap apparatus itself is not configured to mount to a second fiber optic connector or otherwise couple the connector 10 to a second fiber optic connector.

In one example, after the cap 70 is removed, no further cleaning of the ferrule 16 is required prior to mating the connector 10 with another fiber optic connector by way of an adapter or the like. That is, the connector 10 may be inserted into an adapter (not shown) after removing the cap 70 without any further cleaning of the end face 30. The adapter may be used to mate the connector 10 with another similar fiber optic connector. Accordingly, the adapter may include an alignment sleeve used to align the ferrule 16 of connector 10 with a ferrule of the similar connector.

Figure 8:
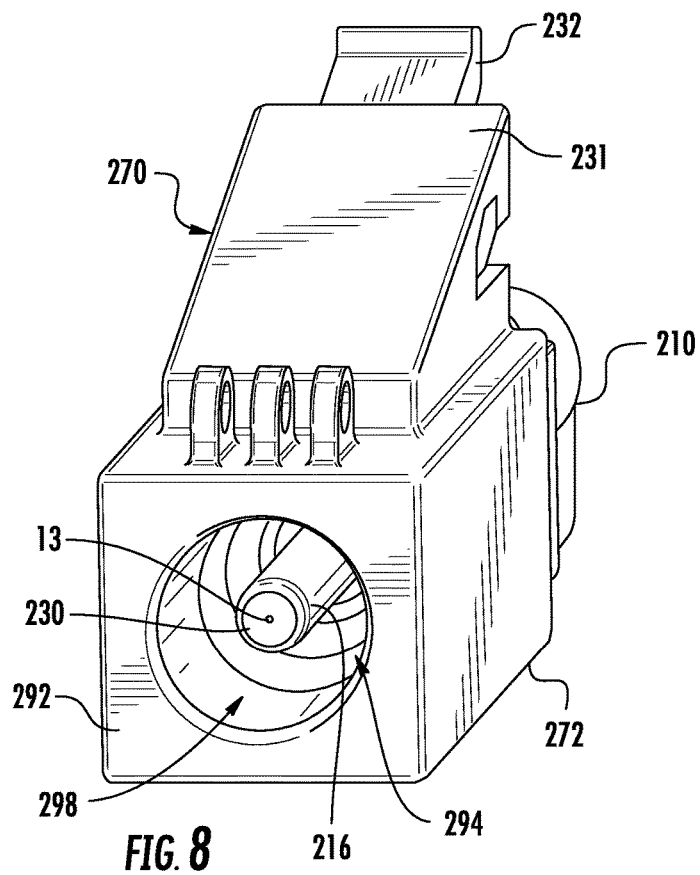
FIG. 8 is a perspective view of a combination of a connector and a body portion of cap according to a second embodiment of the disclosure.
Figure 9:
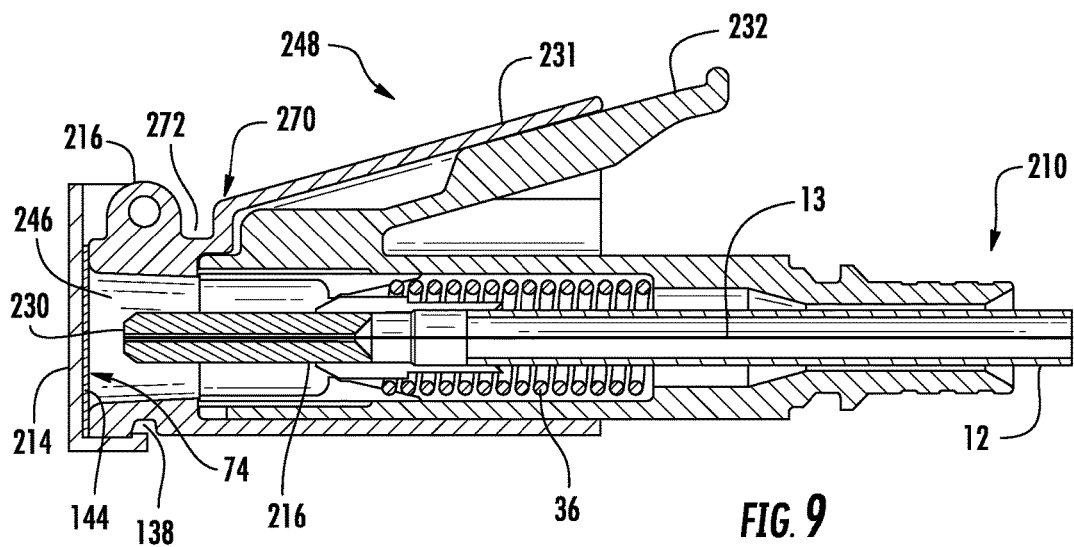
FIG. 9 is a cross-sectional view of the combination of FIG. 8 with a fully assembled cap apparatus, wherein the cap apparatus includes a cap and a sealing apparatus, and the cross-section is taken along line 9-9 of FIG. 10.
Figure 10:
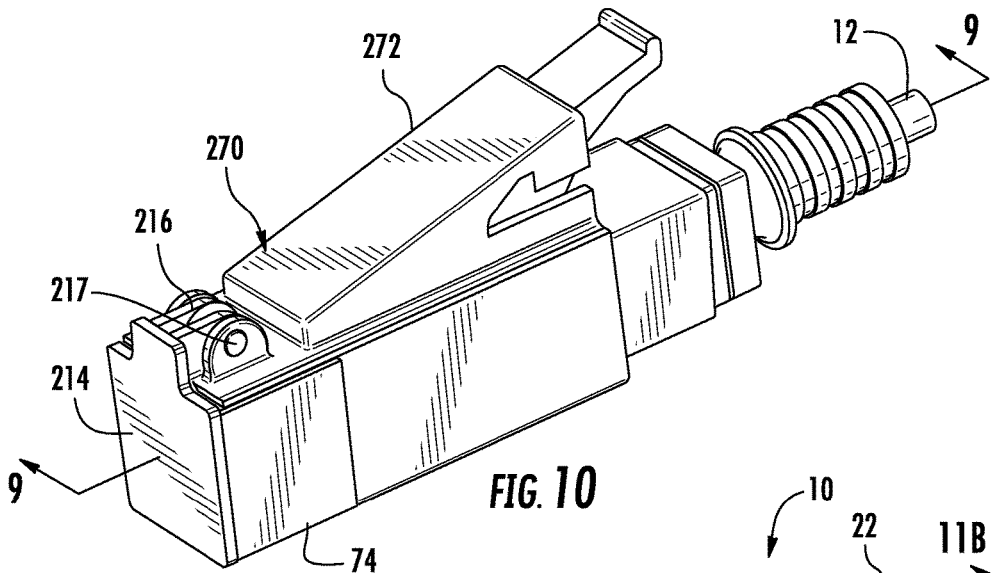
FIG. 10 is a perspective view the combination of FIG. 9.

FIGS. 8-10 illustrate a cap 270 and a sealing apparatus 74 of a second embodiment of the disclosure having similar features as the first embodiment. The first and second embodiments can be alike, except for variations noted and variations that will be apparent to those of ordinary skill in the art. Accordingly, similar or identical features of the embodiments are provided with like or identical reference numbers.

FIG. 8 illustrates the body 272 of the cap 270 mounted to a single-fiber connector 210, such as for facilitating a cleaning process substantially like that discussed above. The body 272 has an attachment feature 231 for releasably mating with the attachment feature 232 of the connector 210. The attachment features 231, 232 typically include latching elements that become latched to one another to securely hold the body 272 and the connector 210 together, wherein this latching may be released by depressing the attachment feature 232 of the connector 210. FIG. 9 illustrates the cap 270 with the sealing apparatus 74 confronting the ferrule 216 to aid in collection of contamination particles that may propagate or migrate into and/or around the sealed chamber 246. As shown in FIG. 10, the cover 214 may be pivotably attached to the body 272 of the cap 270 by a hinge 216 comprising a hinge pin 217 or the like, so that the cover may be moved, or more specifically pivoted, between open and closed positions.

Referring collectively to FIGS. 8-10, the sealing apparatus 74, which may be in the form of adhesive tape or another suitable material discussed above, may be mounted to the distal end 292 of the body 272 so as to at least obstruct, or close and seal the opening 294 to the cavity 298 within the body. As shown in FIG. 9, an area of adhesive material that may be part of the adhesive layer 144 may both confront (e.g., be in opposing face-to-face relation with) the front end face 230 of the ferrule 216, and be spaced apart from the front end face of the ferrule. The cap 270 with the sealing apparatus 74 may be referred to as a cap apparatus 248.

Figure 11A:
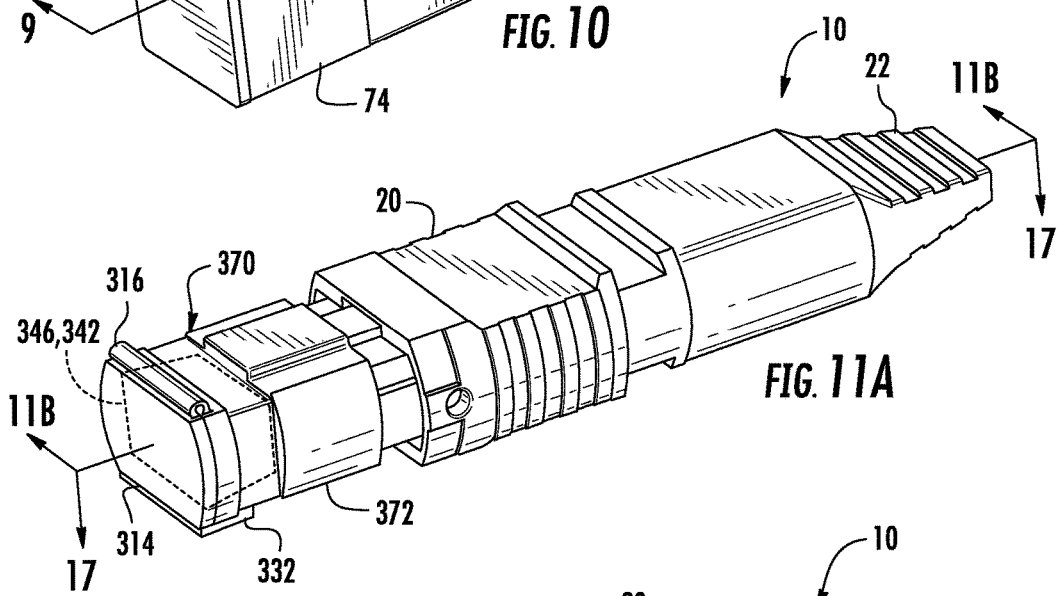
FIG. 11A is a schematic perspective view of a connector and a cap apparatus in accordance with a third embodiment of the disclosure, wherein the cap apparatus includes a cap and a plug-like sealing apparatus.
Figure 11B:
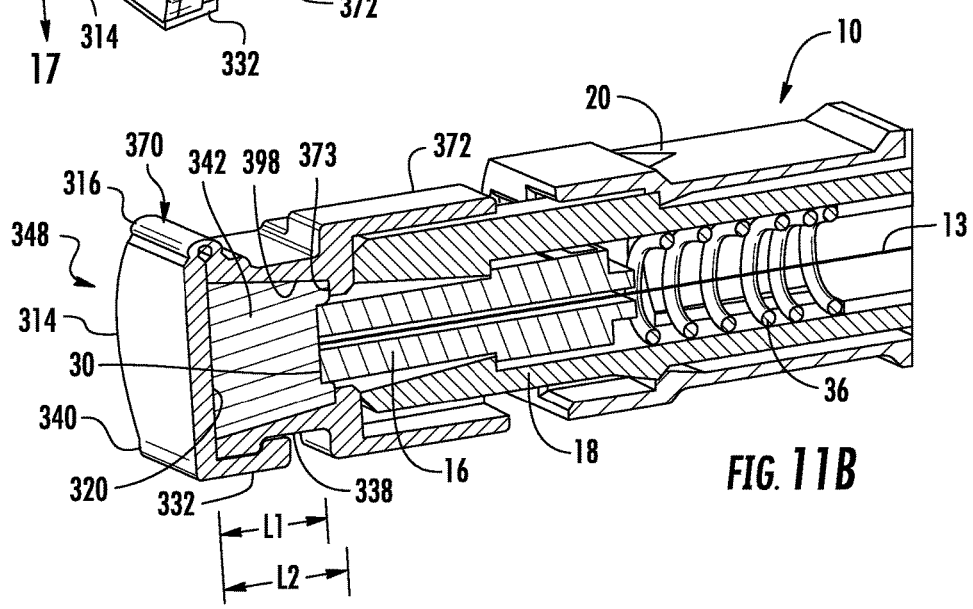
FIG. 11B is a schematic cross-sectional view of a portion of the combination of FIG. 11A, wherein the cross-section is taken along line 11B-11B of FIG. 11A.
Figure 14B:
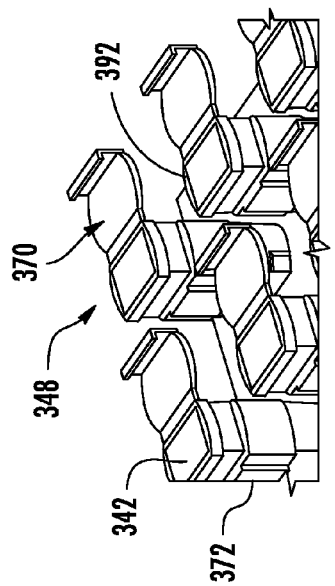
FIG. 14B is an enlarged portion of FIG. 14A.
Figure 14A:
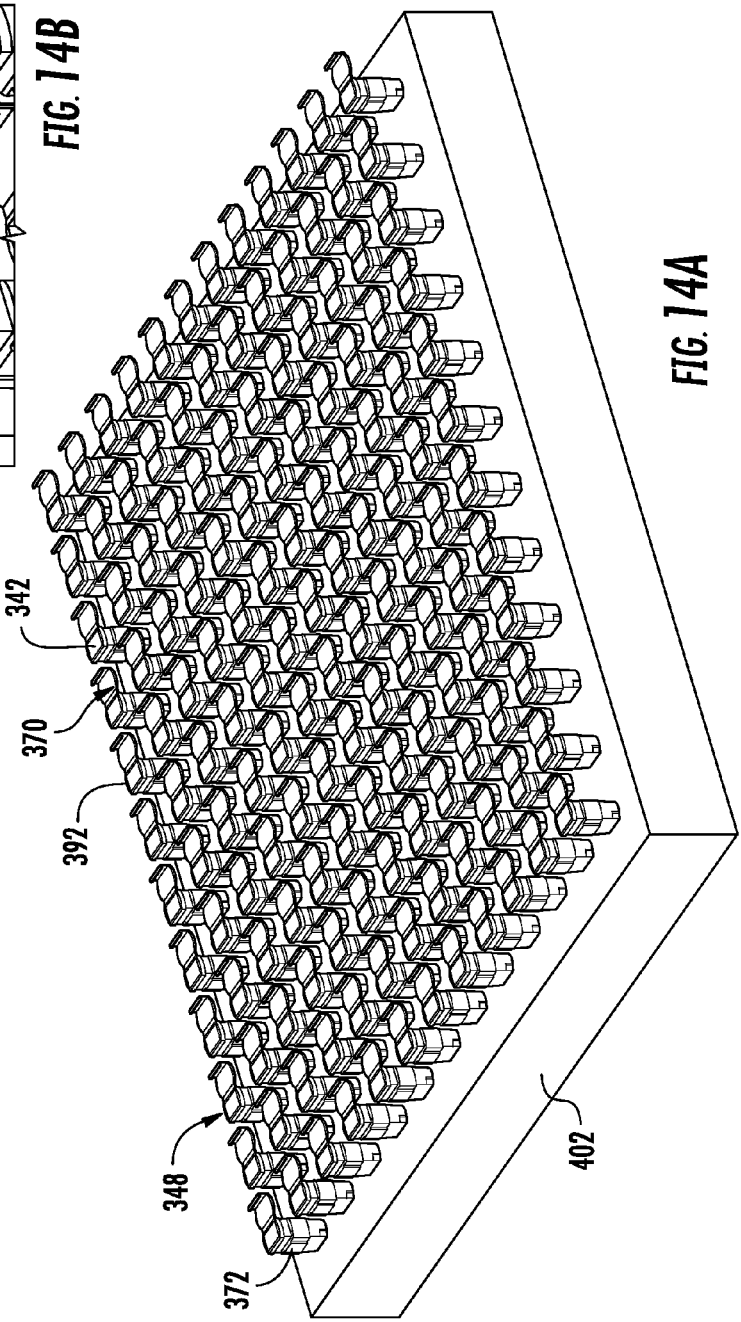

FIGS. 11A and 11B illustrate a cap 370 of a third embodiment of the disclosure having similar features as the first embodiment. The first and third embodiments can be alike, except for variations noted and variations that will be apparent to those of ordinary skill in the art. Accordingly, similar or identical features of the embodiments are provided with like or identical reference numbers.

In the third embodiment, the sealing apparatus comprises a plug 342 that is positioned in the cavity 398 of the cap body 372. The plug 342 may substantially fill and seal the forward portion of the cavity 398 of the cap body 372 and/or substantially completely cover the end face 30 of the ferrule 16 in a manner that seeks to prevent any foreign contamination from entering the cavity 398 and/or depositing on the end face 30. The plug 342 may consist of elastomeric material, such as a UV-curable elastomeric material, a UV-curable rubber material, or any other suitable material.

As more specific examples, the plug 342 may comprise rubbery polymer materials such as those disclosed in U.S. Pat. Nos. 7,232,595, 7,256,221 and 7,723,441, wherein the disclosure in these patents about making and curing the polymer materials are incorporated herein by reference. For example, the plug 342 may have a modulus of elasticity that is greater than the modulus of elasticity of the cap body 372.

Referring to FIG. 11B, while the cap body 370 is securely, fully mounted on the connector 10, and the cover 314 is secured closed, a gap between the interior surface 320 of the cover 314 and the front end face 30 of the ferrule 16 has a lengthwise dimension L1. Similarly, the sealing plug 342 has a lengthwise dimension L2 that may be coaxial with the lengthwise dimension L1. In some embodiments, the lengthwise dimension L2 may be at least the same magnitude as, or greater than, the lengthwise dimension L1. As a result, an inner end face of the plug 342 engages the front end face 30 of the ferrule 16, or more specifically conformingly contacts and thus extends at least partially around the front end face 30 of the ferrule 16. For example, prior to the inner end face of the plug 342 engaging the ferrule 16, the inner end face of the plug may be substantially planar. Then, when the plug 342 engages the front end face 30 of the ferrule 16, the central area or another suitable portion of the inner end face of the plug may be engaged by and compressed by the front end face of the ferrule, so that the plug extends at least partially around the front end face of the ferrule 16.

As best understood with reference to both FIGS. 11A and 11B, the interior walls of the cap body 372 may be angled and/or the cap body may include an inwardly protruding shoulder 373 that engages the inner end face of the plug 342, so that the cap 370 carries the plug away from the connector 10 when the cap is removed from the connector. The cap 370 with the plug 342 therein may be referred to as a cap apparatus 348. In accordance with the third embodiment, the plug 342 is typically positioned in, or more specifically fixedly mounted in, the cavity 398 of the cap body 372, and the cover 314 is secured closed, such as by of the hinge 316, attachment clip or lip 332 and recess 338, or the like, prior to the cap apparatus 348 being mounted to the connector 10. In the third embodiment, the plug 342 is typically not removable from the cap 370, although variations are within the scope of this disclosure.

An example of a method of simultaneously manufacturing a plurality of the cap apparatuses 348 arranged in an array is discussed below, initially with reference to FIGS. 12A-15B. Very generally described, for each cap apparatus 348 (FIGS. 14A-15B), the method includes forming the plug 342 (FIGS. 14A and 15B) in the cap body 372 (FIGS. 13A-15B), by defining a mold cavity 400 (FIGS. 13A and 13B) in the cap body, and molding the plug in the mold cavity. The mold cavity 400 is partially defined by the cavity 398 of the cap body 372, and further partially defined by a mold tool 401 (FIGS. 12A and 12B) removably positioned in the cap body 372. Referring to FIGS. 1, 2, 12A, and 12B, the exterior shape of each mold tool 401 is similar to the exterior shape of the forward portions of the mated together housing 18, ferrule 16, and guide pins 44, except that a ferrule-shaped portion 416 of the mold tool does not extend as far outwardly from a housing-shaped portion 418 of the mold tool, and pin-shaped portions 444 of the mold tool are oversized. The mold tools 401 may extend outwardly from a suitable holding apparatus 402, jig, base, or the like.

For forming each cap apparatus 348, the cap 370 may be mounted to the mold tool 401. This mounting may include causing relative movement between the cap body 372 and the mold tool 401 so that: a) the mold tool extends through the opening 394 to the cavity 398 (FIG. 13B) of the cap body, b) the end face 430 (FIG. 12B) of the ferrule-shaped portion 416 of the mold tool is positioned in the cavity 398, and c) the mold cavity 400 (FIGS. 13A and 13B) is at least partially defined by the end face of the mold tool. The cap 370 may be attached to the mold tool 401 by way of the retention clips or latches 100 (FIGS. 3A and 13A) of the cap body 372 and recesses 408 (FIGS. 12A and 12B) of the mold tool, so that the end face 430 of the ferrule-shaped portion 416 of the mold tool is positioned inside the cavity 398 of the cap body 372. In the third embodiment, the plug 342 (FIGS. 14A and 15B) is formed in the mold cavity 400 by substantially fully filling the mold cavity with a suitable UV-curable elastomeric molding material, examples of which are discussed above, followed by solidifying the plug-forming molding material. For example, ultraviolet light may be used to cure the plug-forming molding material into a solid and thereby form the plug 342, so that the plug is typically fixedly positioned in the cavity 398 of the cap body 372. The plug 342 typically substantially fills both the mold cavity 400 and the opening 396 to the cavity of the cap body.

Figure 16A:
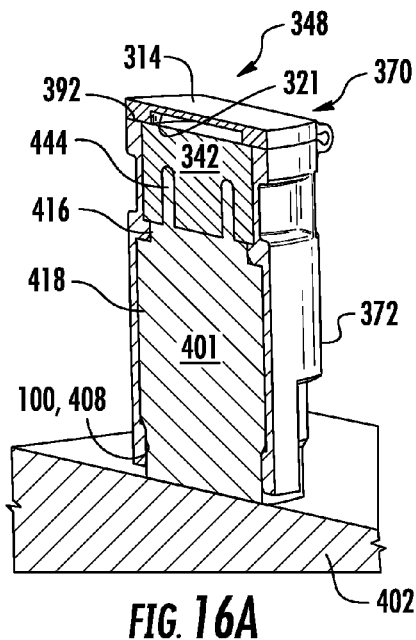
FIGS. 16A and 16B are cross-sectional views of a representative one of the combinations of the cap apparatuses and mold tools of FIGS. 14A and 14B.
Figure 16B:
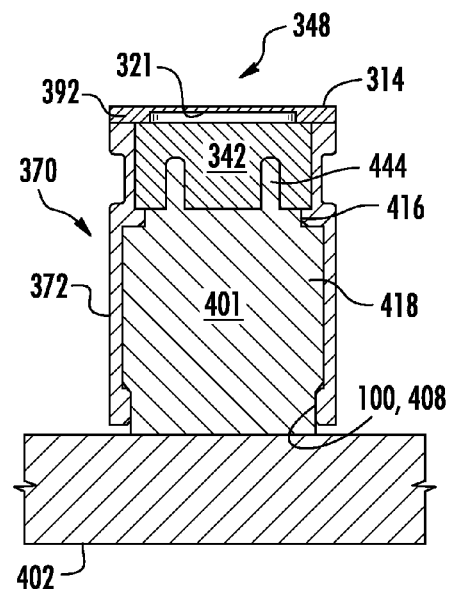

Referring to FIGS. 15A-15B, and especially to FIGS. 16A and 16B, after the plug 342 has cured, the cover 314 may be secured in the second or closed position wherein the cover 314 is confronting, such as by being in face-to-face contact with, the distal end 392 of the cap body 372 for further sealing the opening 396 (FIGS. 13A and 13B) of the cap body. Thereafter, or at any appropriate time after the plug 342 has been sufficiently solidified, the cap apparatus 348 may be removed from the associated mold tool 401 by overcoming the bias of the latches 100 of the cap apparatus to release the latches from the recesses 408 of the mold tool. Then, the cap apparatus 348 may be mounted to a fully assembled connector 10, such as after at least the exposed portions of the ferrule 16, housing 18, and guide pins 44 have been cleaned, so that the cap apparatus seals and protects the precision mating surfaces, such as the end face 30 of the ferrule 16, from damage and contamination.

Figure 17A:
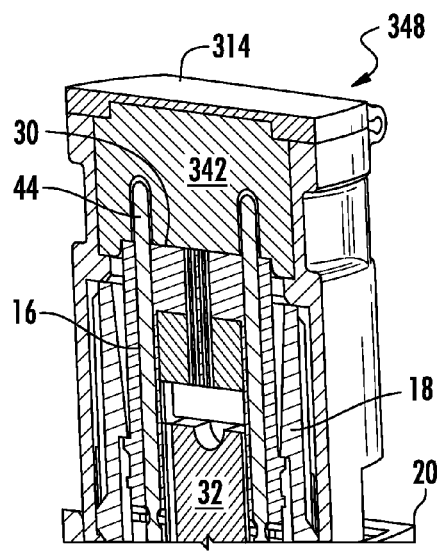
FIGS. 17A and 17B are schematic cross-sectional views of a portion of the combination of FIG. 11A, wherein the cross-sections are taken along line 17-17 of FIG. 11A.
Figure 17B:
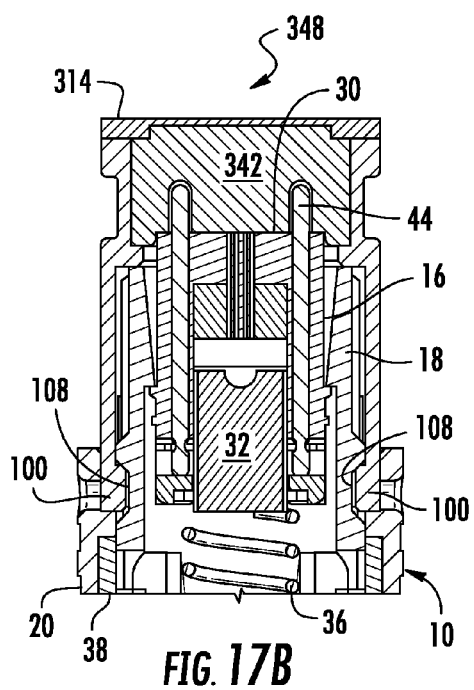

As mentioned above, and now referring to FIGS. 11B, 17A, and FIG. 17B, while the cap body 370 is securely, fully mounted on the connector 10, such as by way of retention clips or latches 100 being respectively mated with the recesses 108, and the cover 314 is secured closed, an inner end face of the plug 342 engages the front end face 30 of the ferrule 16, or more specifically conformingly contacts and thus extends at least partially around the front end face 30 of the ferrule 16. For example, prior to the inner end face of the plug 342 engaging the ferrule 16, the inner end face of the plug may be substantially planar. Then, when the plug 342 engages the front end face 30 of the ferrule 16, the central area or another suitable portion of the of the inner end face of the plug may be engaged by and compressed by the front end face of the ferrule, so that the plug extends at least partially around the front end face of the ferrule 16. In addition, the guide pins 44 may fit with clearance into receptacles formed in the plug 342, so that gaps are present between the guide pins and the plug. As a result, the guide pins do not interfere with the front end face 30 of the ferrule 16 engaging and deforming the plug. In addition, and as best understood with reference to FIGS. 16A and 16B, the inner surface 320 of the cover 314 may include a recess or cavity 321, and the plug 342 may deform into the cavity 321 in response to the front end face 30 of the ferrule 16 engaging and deforming the plug, as shown in FIGS. 17A and 17B.

As discussed above, the plug 342 may be fixedly molded into the cavity 398 of the body 72 of the cap apparatus 348.

Alternatively, the plug 342 may be formed separately from the cap apparatus 348 and thereafter be inserted into the cavity 398 of the body 72 of the cap 70, such as after the cavity 398, the front end face 30 of the ferrule 16, and associated features are simultaneously cleaned, as generally discussed above. Similarly, the plug 342 may be configured for use with a variety of connectors and cap apparatuses. For example, a fourth embodiment of this disclosure can in some ways be like each of the second and third embodiments, except for variations noted and variations that will be apparent to those of ordinary skill in the art. For example and referring to FIGS. 19-21, the sealing apparatus of the cap apparatus 548 of the fourth embodiment is in the form of a plug 542 that may be generally like the plug 342 of the third embodiment, except for variations noted and variations that will be apparent to those of ordinary skill in the art. Accordingly, similar or identical features of the embodiments are provided with like or identical reference numbers.

Figure 18:
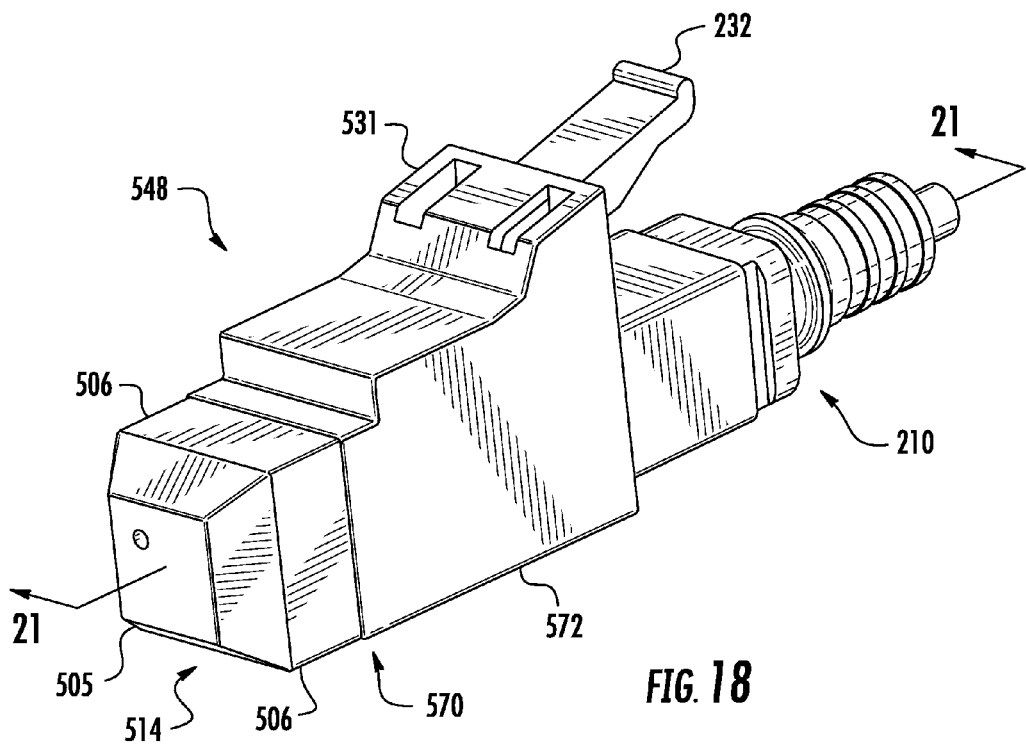
FIG. 18 is a perspective view of a combination of a connector and cap apparatus, in accordance with a fourth embodiment of this disclosure.
Figure 21:
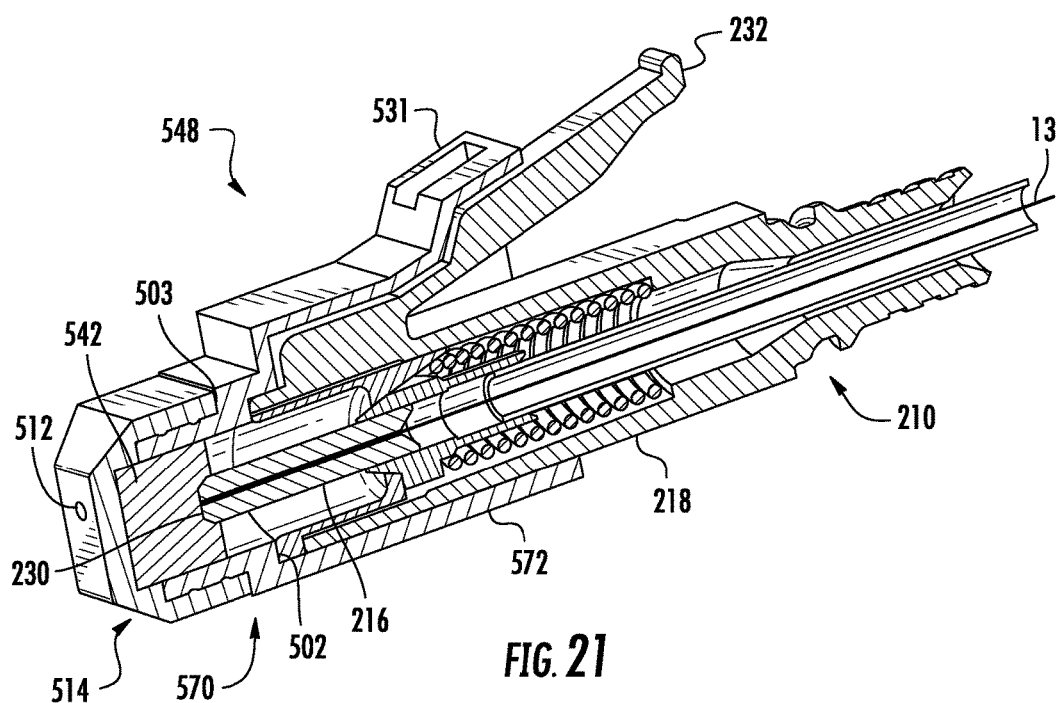
FIG. 21 is a cross-sectional view taken along line 21-21 of FIG. 18.

FIGS. 18 and 21 illustrate the body 572 of the cap 570 mounted to the single-fiber connector 210, and a cover 514 mounted to the body. The body 572 has an attachment feature 531 for releasably mating with the attachment feature 232 of the connector 210. Referring to FIG. 21, the body 572 of the cap 570 includes annular internal and external shoulders 502, 503 for respectively engaging the forward edge of the housing 218 of the connector 210 and the rear edge of the cover 514 of the cap. The body 572 of the cap 570 and the cavity 598 therein transition between rearward and forward sections proximate the shoulders 502, 503. In the fourth embodiment, the rearward section of the cavity 598 substantially conforms in shape to the exterior of the housing 218 of the connector 210; the forward, cylindrical section of the cavity 598 substantially conforms in shape to the cylindrical exterior of the plug 542; and the exterior of the forward section 573 of the body 572 substantially conforms in shape to the an interior portion of the cover 514.

Figure 19:
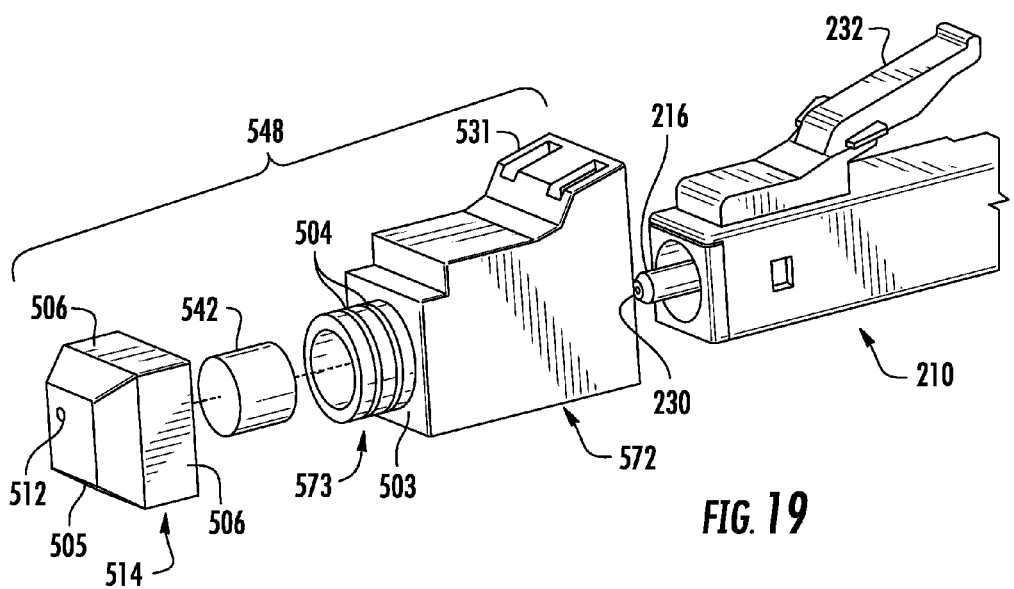
FIG. 19 is a perspective, exploded view of the combination of FIG. 18.
Figure 20:
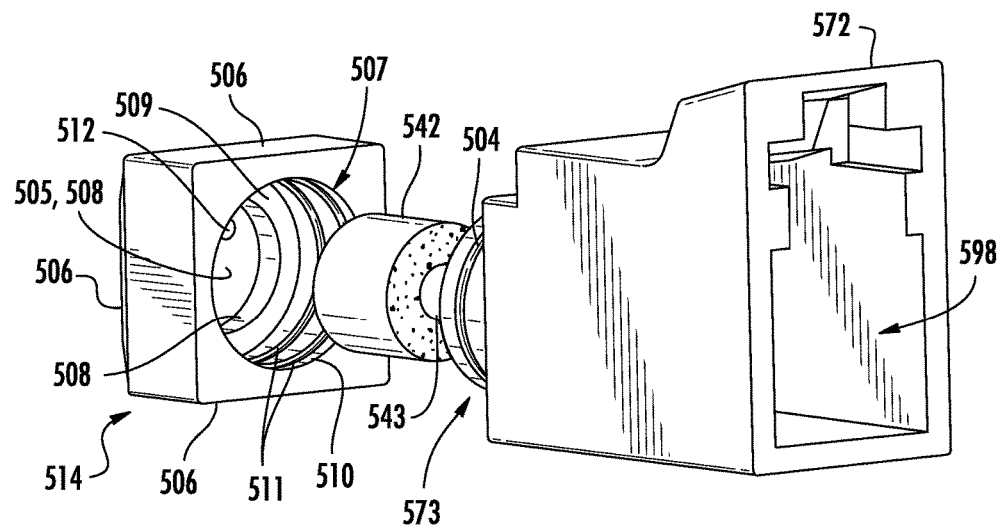
FIG. 20 is a partially schematic, perspective, exploded view of the cap apparatus of FIG. 18.

Referring to FIG. 19, the forward section 573 of the body 572 comprises a cylindrical wall or sleeve with one or more fastener features in the form of outwardly open, annular fastening grooves 504 for at least partially facilitating mounting of the cover 514 to the forward section 573 of the body 572. Referring to FIGS. 18-20, the cover 514 includes a forward wall 505, and one or more side walls 506 extending rearwardly from the periphery of the forward wall and around a tiered internal cavity 507 of the cover 514. Referring to FIG. 20, the tiered cavity 507 of the cover 514 is defined by a disk-shaped inner surface 508 of the forward wall 505; a cylindrical, forward inner surface 508 of the sidewalls 506; an annular inner shoulder 509 of the sidewalls; and a cylindrical, rearward inner surface 510 of the sidewalls. The cylindrical, forward inner surface 508 has a smaller diameter than the cylindrical, rearward inner surface 510. One or more fastener features in the form of annular protrusions 511 extend inwardly from the rearward cylindrical surface 510 for respectively extending into and engaging the annular fastening grooves 504 for at least partially facilitating mounting of the cover 514 to the forward section 573 of the body 572. The positions of the fastening grooves and protrusions 504, 511 may be reversed and/or the fastening grooves and protrusions may be replaced by or supplemented with other suitable fastening features.

The substantially cylindrical forward section 573 of the body 572 has an outer diameter that substantially corresponds to the diameter of the rearward inner surface 510 of the cover 514. The substantially cylindrical forward section 573 of the body 572 has an inner diameter that substantially corresponds to both the outer diameter of the plug 542 and the diameter of the forward inner surface 508 of the cover 514. Accordingly and as best understood with reference to FIG. 21, the plug 542 can fit coaxially and snugly into both the forward portion of the cavity 598 of the cap body 572 and the forward portion of the tiered cavity 507 of the cover 514. As a result, each of the cover 514 and the forward section 573 of the body 572 extend at least partially around, or more specifically extend completely around, the plug 542. As shown in FIG. 21, the plug 542 is compressed between the front face 230 of the ferrule 216 and the inner surface 508 of the front wall 505 of the cover 514. The plug 542 may be constructed of an elastomeric material, as discussed above, so that the central area or another suitable portion of the of the inner end face of the plug is engaged and compressed by the front end face 230 of the ferrule 216, so that the plug 542 extends at least partially around the front end face of the ferrule.

The plug 542 may be constructed of any suitable molding materials discussed above, for example so that the plug 542 may have a modulus of elasticity that is greater than the modulus of elasticity of the cap 570. For example, the plug 542 may be constructed of an elastomeric foam, and the plug 542 may also have adhesive properties. For example, in FIG. 20, stippling schematically represents a gel or adhesive layer on the inner end of the plug 542. Therefore, in addition to the plug 542 being able to seal and protect a previously cleaned end face 230 of the ferrule 216, the adhesive properties or adhesive material associated with the inner end of plug 542 may help to collect any contaminants that may be present and, thus, provide a cleaning function. Preferably any adhesive material associated with the inner end of plug 542 will be operative to release more readily from the end face 230 of the ferrule 216 than from the plug, so that adhesive residue is not left on the end face of the ferrule 216 when the cap apparatus 548 is removed from the connector 210. In addition or alternatively, the adhesive material may be omitted from a central area 543 of the inner end face of the plug 542, so that the central area 543 is at least partially surrounded, or substantially surrounded, by a region of adhesive material on the inner end face of the plug 542. The end face 230 of the ferrule 216, or at least the end of the optical fiber 13, may engage the central area 543 of the inner end face of the plug 542. For at least partially facilitating removal of the cap apparatus 348 or portion(s) thereof from the connector 210, a vent hole 512 may extend through the forward wall 505 of the cover 514 to the tiered cavity 507 within the cover, for releasing any partial vacuum associated with the removal.

As should be apparent from this disclosure, a variety of caps, cap apparatuses, and sealing apparatuses are within the scope of this disclosure. For example, whereas cylindrically-shaped features of the cap 570, cover 514, and plug 542 are discussed above, those features may be shaped differently, such as by being rectangular or in any other suitable shape. Similarly, whereas the rearward section of the cover 514 is generally described above as fitting over and onto the forward section 573 of the cap body 572, the rearward section of the cover may alternatively fit into the forward section of the cap body, as discussed in greater detail below.

Figure 22:
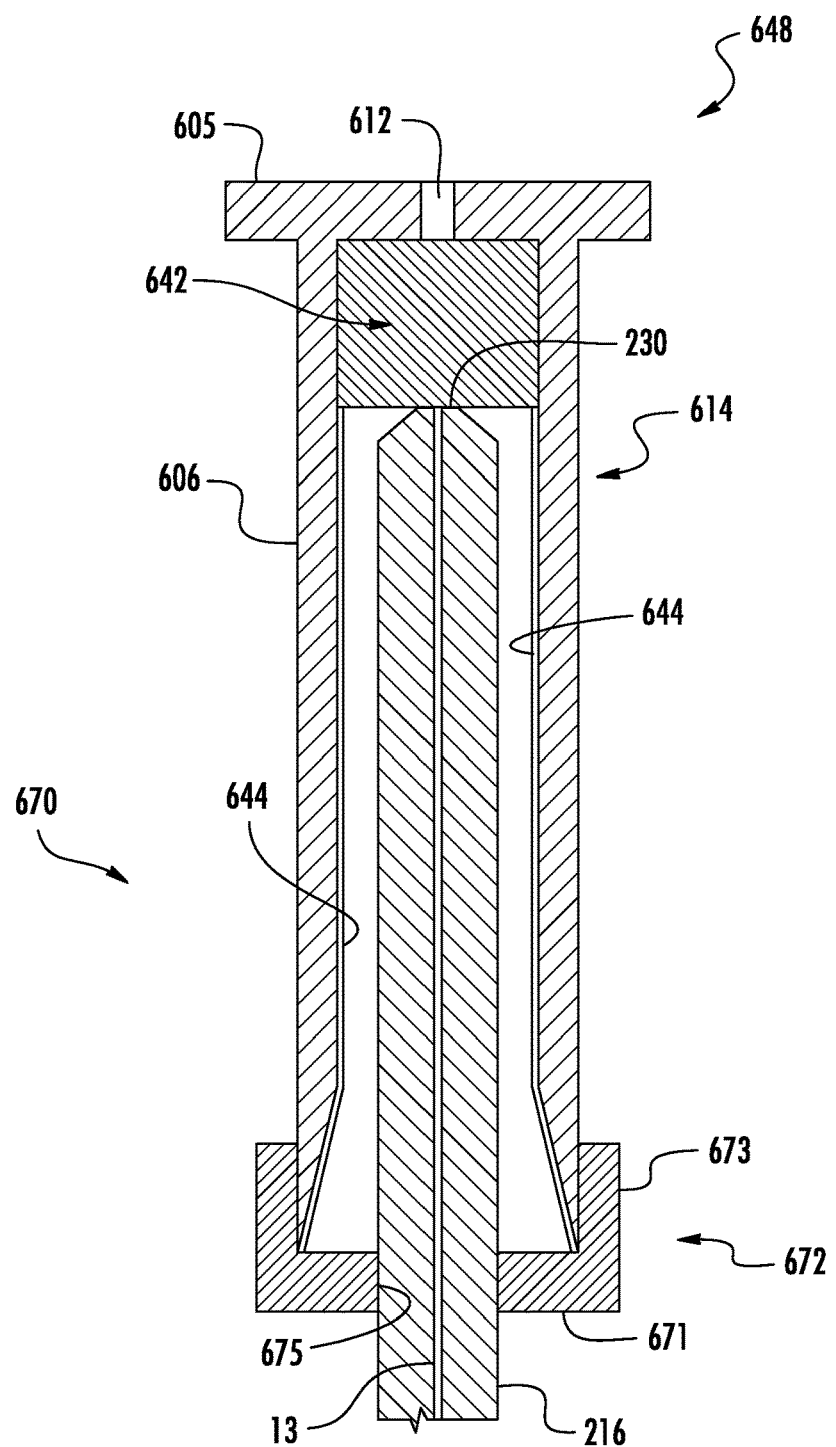
FIG. 22 is a schematic, cross-sectional view of a cap apparatus and a portion of a connector including a ferule and optical fiber, in accordance with a fifth embodiment of this disclosure.

Referring to FIG. 22, in accordance with a fifth embodiment, the at least one sidewall 606 of the cover 614 fits into the forward section 673 of the cap body 672, and the sidewall 606 and the forward section 673 are cooperatively configured so that an interference-fit type of connection is defined therebetween. Alternatively, the connection between the cover 614 and the cap body 672 may be provided in any other suitable manner, such as by way of interacting fastening grooves and protrusions, as discussed above. More generally, the fifth embodiment and the fourth embodiment can be alike, except for variations noted and variations that will be apparent to those of ordinary skill in the art. Accordingly, similar or identical features of the embodiments are provided with like or identical reference numbers.

In the fifth embodiment, the cap body 672 comprises a rearward wall 671 and the forward section 673 of the cap body extends forwardly from the periphery of the rearward wall 671. The rearward wall 671 includes a cylindrical, central hole 675 through which the ferrule 216 is inserted. The diameter of the hole 675 may be only slightly larger than the outer diameter of the ferrule 216 so that the during the relative movement between the rearward wall 671 and ferrule 216, which occurs during installation of the cap apparatus 648, the rearward wall 671 may wipe the outer cylindrical sidewall of the ferrule 216 clean.

As shown in FIG. 22, there is a gap between the outer cylindrical sidewall of the ferrule 216 and the inner surface of the sidewall 606 of the cover 614. Alternatively, there may be contact between the outer cylindrical sidewall of the ferrule 216 and the inner surface of the sidewall 606 of the cover 614. As shown in FIG. 22, a sticky coating of adhesive material 644, or the like, may be fixedly adhered to the inner surface of the sidewall 606, so that any solid contaminants that come into contact with the adhesive material may become adhered to the adhesive material and, thus, be secured to the sidewall 606 and prevented from contaminating the front end face 230 of the ferrule 216.

The plug 642 may be constructed of an elastomeric material, as discussed above, so that the central area or another suitable portion of the of the inner end face of the plug is engaged and compressed by the front end face 230 of the ferrule 216, so that the plug 642 extends at least partially around the front end face of the ferrule. The plug 642 may have a modulus of elasticity that is greater than the modulus of elasticity of the cap body 672. For example, the plug 642 may be constructed of an elastomeric foam, and the plug 642 may also have adhesive properties. Preferably any adhesive material associated with the inner end of plug 642 will be operative to release more readily from the end face 230 of the ferrule 216 than from the plug, so that adhesive residue is not left on the end face of the ferrule 216 when the plug 642 is removed from the ferrule 216. For at least partially facilitating removal of the cap apparatus 648 or portion(s) thereof from the ferrule 216, a vent hole 612 may extend through the forward wall 605 of the cover 614, for releasing any partial vacuum associated with the removal.

An aspect of this disclosure is the provision of methods and features for cleaning and maintaining the cleanliness of fiber optic connectors. For example, one aspect of this disclosure is the provision of features for sealing fiber optic connectors, such as after factory cleaning, until the time they are installed in the field. As another example, in addition to any initial cleaning, this disclosure describes "blockers" (e.g., sealing features) and "getters" (e.g., adhesive features) that are operative to inhibit any transport of contamination to clean end faces 30, 230 of ferrules 16, 216.

An aspect of this disclosure is the provision of a material, which may be in the form of a plug 342, 542, 642, that may be positioned at least partially inside of at least a portion of a cap 70, 270, 370, 570, 670 or a cap apparatus 348, 548, 648, and that may conformingly contact the end face 30, 230 of a ferrule 16, 216 in a manner that seeks to prevent any contamination from transporting to the critical optical area of the associated optical fiber(s) 13. The material, which may be in the form of a plug 342, 542, 642, may be compliant and resilient such that the end faces 30, 230 of the ferrules 16, 216 can push into this material. In addition, this material can contain or carry other materials that may enhance or improve other properties. For example, the plugs 342, 542, 642 may also include an antistatic feature or material, which seeks to prevent any static charge from building up on connector end faces 30, 230 of the ferrules 16, 216, since any such static charges may tend to attract airborne dust particles when the caps 70, 270, 370, 570, 670 and/or cap apparatuses 348, 548, 648 are removed. As another example, the plugs 342, 542, 642 may have a sticky surface that may function as a cleaning agent and a trap for external contamination.

The conformable material, which may be in the form of a plug 342, 542, 642, may block any contaminants from reaching the end face 30, 230 of a ferrule 16, 216, and any associated adhesive material may function to trap any contaminates so that the contaminates do not reach, or are removed from, the end face 30, 230 of the ferrule 16, 216. The conformable material may include rubber, foam, silicone, cloth, woven material, sponge, a sticky material and/or any other suitable material. Alternatively, the each plug 342, 542, 642 may be constructed of a hard material that may include a sticky material that may, in one example, be in close proximity to, yet spaced from, the end face 30, 230 of the ferrule 16, 216. The material, which may be in the form of a plug 342, 542, 642, may be treated so that so that it can hold another material or bloom another material to its surface after manufacturing to enhance other parameters. For example, the material, which may be in the form of a plug 342, 542, 642, may have: properties that control static, such as by reducing, eliminating or enhancing static electricity; anti-stick properties; sticky properties; hydrophobic properties; non-spalling properties; non-p articulating properties; lubricating properties and/or optical index matching properties.

Regarding the possibility of the material, which may be in the form of a plug 342, 542, 642, having optical index matching properties, the material may impart optical index matching properties to the ferrule end faces 30, 230, so that the ferrule end faces retain the optical index matching properties after the plugs 342, 542, 642, or the like, are removed. The optical index matching properties of the material, which may be in the form of the plugs 342, 542, 642, may be imparted through the use of additives or depositing appropriate materials on the respective surfaces of the plugs 342, 542, 642, or the like. For example, an additive may be a substance that blooms to the respective surfaces of the plugs 342, 542, 642, or the like, and leaves a thin layer of a waxy substance, or the like, on the associated end surfaces of the optical fibers 13, wherein the waxy substance, or the like, may have anti-static, anti-stick and/or index matching properties.

In accordance with one example, appropriate areas of the connectors 10, 210 may be cleaned in the factory, and then the clean end faces 30, 230 of the ferrules 16, 216 are sealed with the cap apparatuses 148, 248, 348, 548, 648, which may be later removed in the field for installation.

Persons skilled in optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A method for cleaning at least an end face of a ferrule of an fiber optic connector and enclosing at least the end face of the ferrule in a cap apparatus, the method comprising:
    mounting a body of the cap apparatus to the fiber optic connector, wherein the body has opposite proximal and distal ends between which a cavity extends, the proximal end defining a first opening to the cavity, the distal end defining a second opening to the cavity, and the mounting being comprised of causing relative movement between the body and the fiber optic connector so that at least a portion of the fiber optic connector extends through the first opening;
    cleaning at least the end face of the ferrule while the body is mounted to the fiber optic connector; and
    then, sealing closed the cavity of the cap apparatus with a sealing apparatus so that at least the cleaned end face of the ferrule is positioned in the sealed closed cavity;
    wherein the cap apparatus further includes a cover mounted to the body and movable between a closed configuration in which the cover at least partially obstructs the second opening and an open configuration in which at least a portion of the cover is farther away from the second opening than when the cover is in the closed configuration, and further wherein the cleaning is performed when the cover is in the open configuration; and
    wherein the sealing closed comprises applying the sealing apparatus to the body of the cap apparatus before moving the cover from the open configuration to the closed configuration.

2. The method of claim 1, wherein the cleaning is further comprised of cleaning at least a portion of an interior of the body.

3. The method of claim 1, wherein the cleaning is further comprised of cleaning at least a portion of the sealing apparatus.

4. The method of claim 1, wherein the sealing apparatus comprises an adhesive tape that at least partially obstructs the second opening of the body when the adhesive tape is applied to the body.

5. The method of claim 4, wherein an exterior of the body comprises opposite first and second sides, and wherein applying the sealing apparatus to the body comprises:
    engaging a first area of adhesive material of the adhesive tape against the first side of the exterior of the body; and
    engaging a second an area of adhesive material of the adhesive tape against the second side of the exterior of the body.

6. The method of claim 4, wherein the second opening is sealed closed by the adhesive tape.

7. The method of claim 1, wherein the sealing closed is comprised of at least partially obstructing the second opening of the body with the sealing apparatus.

8. The method of claim 1, further comprising:
    removing the cap apparatus from the fiber optic connector after the cavity of the cap apparatus has been sealed closed for a period of time; and
    inserting the fiber optic connector into an adapter without further cleaning the end face of the ferrule.

9. The method of claim 8, wherein inserting the fiber optic connector into an adapter further comprises aligning the ferrule of the fiber optic connector with a ferrule of a similar fiber optic connector using an alignment sleeve within the adapter.

10. The method of claim 1, wherein the end face of the ferrule is spaced from the sealing apparatus when the cover is in the closed configuration.

11. The method of claim 1, wherein mounting the body of the cap apparatus to the fiber optic connector comprises positioning the end face of the ferrule closer to the second opening than the first opening.

12. The method of claim 1, wherein the end face of the ferrule is spaced from the cover by a distance S that is less than 5 mm after the cover is moved to the closed configuration.

13. A method for cleaning at least an end face of a ferrule of an fiber optic connector and enclosing at least the end face of the ferrule in a cap apparatus, the method comprising:
    mounting a body of the cap apparatus to the fiber optic connector, wherein the body has opposite proximal and distal ends between which a cavity extends, the proximal end defining a first opening to the cavity, the distal end defining a second opening to the cavity, and the mounting being comprised of causing relative movement between the body and the fiber optic connector so that at least a portion of the fiber optic connector extends through the first opening;
    cleaning at least the end face of the ferrule while the body is mounted to the fiber optic connector; and
    sealing closed the cavity of the cap apparatus with a sealing apparatus so that at least the cleaned end face of the ferrule is positioned in the sealed closed cavity;
    wherein:
        the sealing apparatus comprises an area of adhesive material that both confronts the end face of the ferrule and is spaced apart from the end face of the ferrule when the cover is in the closed configuration;
        the sealing apparatus comprises adhesive tape, and the adhesive tape comprises the area of adhesive material; and
        the second opening is sealed closed by the adhesive tape;
    wherein the cap apparatus further includes a cover movable between a closed configuration in which the cover at least partially obstructs the second opening and an open configuration in which at least a portion of the cover is farther away from the second opening than when the cover is in the closed configuration, and further wherein the cleaning is performed when the cover is in the open configuration;
    wherein the sealing closed comprises applying the sealing apparatus to the body or the cover of the cap apparatus before moving the cover from the open configuration to the closed configuration.

14. The method of claim 13, wherein the cover is pivotably connected to the body to move from the open configuration to the closed configuration.

15. The method of claim 13, further comprising:
    removing the cap apparatus from the fiber optic connector after the cavity of the cap apparatus has been sealed closed for a period of time; and inserting the fiber optic connector into an adapter without further cleaning the end face of the ferrule.

16. The method of claim 15, wherein inserting the fiber optic connector into an adapter further comprises aligning the ferrule of the fiber optic connector with a ferrule of a similar fiber optic connector using an alignment sleeve within the adapter.

17. The method of claim 13, wherein the end face of the ferrule is spaced from the sealing apparatus when the cover is in the closed configuration.

* * * * *

UNITED STATES PATENT AND TRADEMARK OFFICE
CERTIFICATE OF CORRECTION

PATENT NO. : 10,133,010 B2
APPLICATION NO. : 15/165194
DATED : November 20, 2018
INVENTOR(S) : Adam Kent Collier et al.

Page 1 of 1

It is certified that error appears in the above-identified patent and that said Letters Patent is hereby corrected as shown below:

On the Title Page

In Column 1, item (73), Assignee, Line 2, delete "SC (US)" and insert -- NC (US) --, therefor.

In the Claims

In Column 19, Line 60, Claim 5, after "second" delete "an".

Signed and Sealed this
Eighth Day of September, 2020

Andrei Iancu
*Director of the United States Patent and Trademark Office*